(12) United States Patent
Huang et al.

(10) Patent No.: US 7,464,013 B2
(45) Date of Patent: Dec. 9, 2008

(54) DYNAMICALLY BALANCED CUTTING TOOL SYSTEM

(75) Inventors: Sujian Huang, Beijing (CN); Stuart Oliver, Magnolia, TX (US); Graham Mensa-Wilmot, Houston, TX (US)

(73) Assignee: Smith International, Inc., Houston, TX (US)

( * ) Notice: Subject to any disclaimer, the term of this patent is extended or adjusted under 35 U.S.C. 154(b) by 132 days.

(21) Appl. No.: 11/100,337

(22) Filed: Apr. 6, 2005

(65) Prior Publication Data

US 2005/0273302 A1 Dec. 8, 2005

Related U.S. Application Data

(63) Continuation-in-part of application No. 10/888,446, filed on Jul. 9, 2004, and a continuation-in-part of application No. 10/888,358, filed on Jul. 9, 2004, and a continuation-in-part of application No. 10/852,574, filed on May 24, 2004, and a continuation-in-part of application No. 10/851,677, filed on May 21, 2004, now Pat. No. 7,020,597, and a continuation-in-part of application No. 10/749,019, filed on Dec. 29, 2003, and a continuation-in-part of application No. 09/689,299, filed on Oct. 11, 2000, now Pat. No. 6,785,641, and a continuation-in-part of application No. 09/635,116, filed on Aug. 9, 2000, now Pat. No. 6,873,947, and a continuation-in-part of application No. 09/524,088, filed on Mar. 13, 2000, now Pat. No. 6,516,293.

(51) Int. Cl.
*G06G 7/48* (2006.01)

(52) U.S. Cl. ............................. 703/7; 703/2; 73/152.47
(58) Field of Classification Search ................... 703/7, 703/10; 700/28, 29, 30, 31, 117; 175/24, 175/39, 57, 374; 73/152.47; 340/853.3; 702/9

See application file for complete search history.

(56) References Cited

U.S. PATENT DOCUMENTS

| 4,187,922 | A | * | 2/1980 | Phelps ........................ 175/374 |
| 4,630,694 | A | | 12/1986 | Walton et al. |
| 4,694,918 | A | | 9/1987 | Hall |
| 4,867,015 | A | | 9/1989 | Kane et al. |
| 4,903,245 | A | * | 2/1990 | Close et al. ............. 340/853.3 |

(Continued)

FOREIGN PATENT DOCUMENTS

EP 0550254 7/1993

(Continued)

OTHER PUBLICATIONS

Brett et al., J.F. Planning and Practical Problem Solving Using and Engineering Simulator, SPE 13206, 1984, pp. 1-12.*

(Continued)

*Primary Examiner*—Russell Frejd
(74) *Attorney, Agent, or Firm*—Osha Liang, LLP

(57) ABSTRACT

A method of dynamically balancing a hole enlargement system is disclosed. The method includes modeling the hole enlargement system based on input parameters, simulating the hole enlargement system, adjusting one or more of the input parameters, and repeating the modeling, simulating, and adjusting until a balanced condition is met.

7 Claims, 14 Drawing Sheets

U.S. PATENT DOCUMENTS

| | | | |
|---|---|---|---|
| 5,035,293 | A | 7/1991 | Rives |
| 5,663,512 | A | 9/1997 | Schader et al. |
| 5,794,720 | A | 8/1998 | Smith et al. |
| 5,864,058 | A * | 1/1999 | Chen ........................ 73/152.47 |
| 5,992,542 | A | 11/1999 | Rives |
| 6,095,262 | A * | 8/2000 | Chen ........................... 175/57 |
| 6,109,368 | A | 8/2000 | Goldman et al. |
| 6,131,673 | A | 10/2000 | Goldman et al. |
| 6,276,465 | B1 * | 8/2001 | Cooley et al. ................. 175/24 |
| 6,374,704 | B1 | 4/2002 | Scott et al. |
| 6,374,926 | B1 | 4/2002 | Goldman et al. |
| 6,408,953 | B1 | 6/2002 | Goldman et al. |
| 6,612,382 | B2 | 9/2003 | King |
| 6,732,817 | B2 | 5/2004 | Dewey et al. |
| 6,935,442 | B2 | 8/2005 | Boulet et al. |
| 6,986,395 | B2 * | 1/2006 | Chen ........................... 175/39 |
| 7,032,689 | B2 | 4/2006 | Goldman et al. |
| 7,035,778 | B2 | 4/2006 | Goldman et al. |
| 7,085,696 | B2 | 8/2006 | King |
| 2003/0178232 | A1 | 9/2003 | Mensa-Wilmot |
| 2004/0059554 | A1 | 3/2004 | Goldman et al. |
| 2004/0182606 | A1 | 9/2004 | Goldman et al. |
| 2004/0222025 | A1 | 11/2004 | Beaton |
| 2004/0236553 | A1 | 11/2004 | Chen et al. |
| 2005/0149306 | A1 | 7/2005 | King |
| 2005/0284661 | A1 | 12/2005 | Goldman et al. |

FOREIGN PATENT DOCUMENTS

| | | |
|---|---|---|
| GB | 2 216 661 | 10/1989 |
| GB | 2367843 A | 4/2002 |
| GB | 2424975 | 10/2006 |
| WO | 05/008020 | 1/2005 |

OTHER PUBLICATIONS

Tucker et al., W.R. An Integrated Model for Drill-String Dynamics, Journal of Sound and Vibration, vol. 224, Jul. 1999, pp. 123-165.*

Tucker et al., W.R. On te Effective Control of Torsional Vibrations in Drilling Systems, Journal of Sound and Vibration, vol. 224, Jul. 1999, pp. 101-122.*

Ma et al., D. Dynamics of Roller Cone Bits, Journal of Energy Resources Technology, Dec. 1985, vol. 107, pp. 543-548.*

Pessier et al., R.C.O. Rolling Cone Bits with Novel Gauge Cutting Structure, Drill Faster, More Efficiently, SPE 30473, pp. 241-250, 1995.*

Sheppard et al., M.C. The Forces at the Teeth of a Drilling Rollercone Bit: Theory and Experiment, SPE 18042, 1988, pp. 253-260.*

Umez-Eronini, E.I. Rotary Drill Bit/Rock Model with Cutter Offset, Journal of Energy Resources Technology, vol. 105, Sep. 1983, pp. 356-361.*

Chen et al., S.L. Field Investigation of the Effects of Stick-Slip, Lateral, and Whirl Vibrations on Roller Cone Bit Performance, SPE 56439, pp. 1-10, 1998.*

Ma, D. The Operational Mechanics of the Rock Bit, Petroleum Industry Press, Copyright 1996, pp. 1-243.*

Corresponding UK Application No. GB 0606767.2—Combined Search and Examination Report dated Aug. 2, 2006 (7 pages).

U.S. Office Action issued in corresponding U.S. Appl. No. 11/385,969; Dated Dec. 19, 2006; 10 pages.

Combined Search and Examination Report issued in Application No. GB0705138.6 dated Jul. 6, 2007 (6 pages).

Examination Report issued in Application No. GB0606767.2 dated Jun. 15, 2007 (7 pages).

* cited by examiner

DYNAMICALLY BALANCED CUTTING TOOL SYSTEM

CROSS-REFERENCE TO RELATED APPLICATIONS

This application claims the benefit, pursuant to 35 U.S.C. § 120, as a continuation-in-part application of U.S. patent application Ser. No. 09/524,088 filed Mar. 13, 2000 (now U.S. Pat. No. 6,516,293), Ser. No. 09/635,116 filed Aug. 9, 2000 (now U.S. Pat. No. 6,873,947), Ser. Nos. 10/749,019 filed Dec. 29, 2003, Ser. No. 09/689,299 filed Oct. 11, 2000 (now U.S. Pat. No. 6,785,641), Ser. No. 10/852,574 filed May 24, 2000 (now U.S. Pat. No. 7,139,689), Ser. No. 10/851,677 filed May 21, 2004 (now U.S. Pat. No. 7,020,597), Ser. No. 10/888,358 filed Jul. 9, 2004, Ser. No. 10/888,446 filed Jul. 9, 2004, all of which are expressly incorporated by reference in their entirety.

BACKGROUND OF INVENTION

1. Field of the Invention

The invention relates generally to methods and systems involving cutting tools in oilfield applications.

2. Background Art

FIG. 1 shows one example of a conventional drilling system for drilling an earth formation. The drilling system includes a drilling rig 10 used to turn a drilling tool assembly 12 that extends downward into a well bore 14. The drilling tool assembly 12 includes a drilling string 16, and a bottomhole assembly (BHA) 18, which is attached to the distal end of the drill string 16. The "distal end" of the drill string is the end furthest from the drilling rig.

The drill string 16 includes several joints of drill pipe 16a connected end to end through tool joints 16b. The drill string 16 is used to transmit drilling fluid (through its hollow core) and to transmit rotational power from the drill rig 10 to the BHA 18. In some cases the drill string 16 further includes additional components such as subs, pup joints, etc.

The BHA 18 includes at least a drill bit 20. Typical BHA's may also include additional components attached between the drill string 16 and the drill bit 20. Examples of additional BHA components include drill collars, stabilizers, measurement-while-drilling (MWD) tools, logging-while-drilling (LWD) tools, subs, hole enlargement devices (e.g., hole openers and reamers), jars, accelerators, thrusters, downhole motors, and rotary steerable systems.

In general, drilling tool assemblies 12 may include other drilling components and accessories, such as special valves, such as kelly cocks, blowout preventers, and safety valves. Additional components included in a drilling tool assembly 12 may be considered a part of the drill string 16 or a part of the BHA 18 depending on their locations in the drilling tool assembly 12.

The drill bit 20 in the BHA 18 may be any type of drill bit suitable for drilling earth formation. Two common types of drill bits used for drilling earth formations are fixed-cutter (or fixed-head) bits and roller cone bits. FIG. 2 shows one example of a fixed-cutter bit. FIG. 3 shows one example of a roller cone bit.

Referring to FIG. 2, fixed-cutter bits (also called drag bits) 21 typically comprise a bit body 22 having a threaded connection at one end 24 and a cutting head 26 formed at the other end. The head 26 of the fixed-cutter bit 21 typically includes a plurality of ribs or blades 28 arranged about the rotational axis of the drill bit and extending radially outward from the bit body 22. Cutting elements 29 are embedded in the raised ribs 28 to cut formation as the drill bit is rotated on a bottom surface of a well bore. Cutting elements 29 of fixed-cutter bits typically comprise polycrystalline diamond compacts (PDC) or specially manufactured diamond cutters. These drill bits are also referred to as PDC bits.

Referring to FIG. 3, roller cone bits 30 typically comprise a bit body 32 having a threaded connection at one end 34 and one or more legs (typically three) extending from the other end. A roller cone 36 is mounted on each leg and is able to rotate with respect to the bit body 32. On each cone 36 of the drill bit 30 are a plurality of cutting elements 38, typically arranged in rows about the surface of the cone 36 to contact and cut through formation encountered by the drill bit. Roller cone bits 30 are designed such that as a drill bit rotates, the cones 36 of the roller cone bit 30 roll on the bottom surface of the well bore (called the "bottomhole") and the cutting elements 38 scrape and crush the formation beneath them. In some cases, the cutting elements 38 on the roller cone bit 30 comprise milled steel teeth formed on the surface of the cones 36. In other cases, the cutting elements 38 comprise inserts embedded in the cones. Typically, these inserts are tungsten carbide inserts or polycrystalline diamond compacts. In some cases hardfacing is applied to the surface of the cutting elements and/or cones to improve wear resistance of the cutting structure.

For a drill bit 20 to drill through formation, sufficient rotational moment and axial force must be applied to the drill bit 20 to cause the cutting elements of the drill bit 20 to cut into and/or crush formation as the drill bit is rotated. The axial force applied on the drill bit 20 is typically referred to as the "weight on bit" (WOB). The rotational moment applied to the drilling tool assembly 12 at the drill rig 10 (usually by a rotary table or a top drive mechanism) to turn the drilling tool assembly 12 is referred to as the "rotary torque". The speed at which the rotary table rotates the drilling tool assembly 12, typically measured in revolutions per minute (RPM), is referred to as the "rotary speed". Additionally, the portion of the weight of the drilling tool assembly supported at the rig 10 by the suspending mechanism (or hook) is typically referred to as the hook load.

As the drilling industry continues to evolve, methods of simulating and/or modeling the performance of components used in the drilling industry have begun to be developed. Drilling tool assemblies can extend more than a mile in length while being less than a foot in diameter. As a result, these assemblies are relatively flexible along their length and may vibrate when driven rotationally by the rotary table. Drilling tool assembly vibrations may also result from vibration of the drill bit during drilling. Several modes of vibration are possible for drilling tool assemblies. In general, drilling tool assemblies may experience torsional, axial, and lateral vibrations. Although partial damping of vibration may result due to viscosity of drilling fluid, friction of the drill pipe rubbing against the wall of the well bore, energy absorbed in drilling the formation, and drilling tool assembly impacting with well bore wall, these sources of damping are typically not enough to suppress vibrations completely.

One example of a method that may be used to simulate a drilling tool assembly is disclosed in U.S. patent application Ser. No. 09/689,299 (now U.S. Pat. No. 6,785,641) entitled "Simulating the Dynamic Response of a Drilling Tool Assembly and its Application to Drilling Tool Assembly Design Optimizing and Drilling Performance Optimization", which is incorporated by reference in its entirety.

Vibrations of a drilling tool assembly are difficult to predict because different forces may combine to produce the various modes of vibration, and models for simulating the response of an entire drilling tool assembly including a drill bit interacting with formation in a drilling environment have not been available. Drilling tool assembly vibrations are generally undesirable, not only because they are difficult to predict, but also because the vibrations can significantly affect the instantaneous force applied on the drill bit. This can result in the drill bit not operating as expected.

For example, vibrations can result in off-centered drilling, slower rates of penetration, excessive wear of the cutting elements, or premature failure of the cutting elements and the drill bit. Lateral vibration of the drilling tool assembly may be a result of radial force imbalances, mass imbalance, and drill bit/formation interaction, among other things. Lateral vibration results in poor drilling tool assembly performance, overgage hole drilling, out-of-round, or "lobed" well bores and premature failure of both the cutting elements and drill bit bearings. Lateral vibration is particularly problematic if hole openers are used.

During drilling operations, it may be desirable to increase the diameter of the drilled wellbore to a selected larger diameter. Further, increasing the diameter of the wellbore may be necessary if, for example, the formation being drilled is unstable such that the wellbore diameter changes after being drilled by the drill bit. Accordingly, tools known in the art such as "hole openers" and "underreamers" have been used to enlarge diameters of drilled wellbores.

In some drilling environments, it may be advantageous, from an ease of drilling standpoint, to drill a smaller diameter borehole (e.g., an 8½ inch diameter hole) before opening or underreaming the borehole to a larger diameter (e.g., to a 17½ inch diameter hole). Other circumstances in which first drilling smaller hole and then underreaming or opening the hole include directionally drilled boreholes. It is difficult to directionally drill a wellbore with a large diameter bit because, for example, larger diameter bits have an increased tendency to "torque-up" (or stick) in the wellbore. When a larger diameter bit "torques-up", the bit tends to drill a tortuous trajectory because it periodically sticks and then frees up and unloads torque. Therefore it is often advantageous to directionally drill a smaller diameter hole before running a hole opener in the wellbore to increase the wellbore to a desired larger diameter.

A typical prior art hole opener is disclosed in U.S. Pat. No. 4,630,694 issued to Walton et al. The hole opener disclosed in the '694 patent includes a bull nose, a pilot section, and an elongated body adapted to be connected to a drillstring used to drill a wellbore. The hole opener also includes a triangularly arranged, hardfaced blade structure adapted to increase a diameter of the wellbore.

Another prior art hole opener is disclosed in U.S. Pat. No. 5,035,293 issued to Rives. The hole opener disclosed in the '293 patent may be used either as a sub in a drill string, or may be coupled to the bottom end of a drill string in a manner similar to a drill bit. This particular hole opener includes radially spaced blades with cutting elements and shock absorbers disposed thereon.

Other prior art hole openers include, for example, rotatable cutters affixed to a tool body in a cantilever fashion. Such a hole opener is shown, for example, in U.S. Pat. No. 5,992,542 issued to Rives. The hole opener disclosed in the '542 patent includes hardfaced cutter shells that are similar to roller cones used with roller cone drill bits.

U.S. Pat. Publication No. 2004/0222025 (now U.S. Pat. No. 7,111,694), which is assigned to the assignee of the present invention, and is incorporated by reference in its entirety, discloses a hole opener wherein cutting elements may be positioned on the respective blades so as to balance a force or work distribution and provide a force or work balanced cutting structure. "Force balance" may refer to a substantial balancing of any force during drilling (lateral, axial, torsional, and/or vibrational, for example). One method of later force balancing has been described in detail in, for example, T. M. Warren et al., Drag Bit Performance Modeling, paper no. 15617, Society of Petroleum Engineers, Richardson, Tex., 1986. Similarly, "work balance" refers to a substantial balancing of work performed between the blades and between cutting elements on the blades.

The term "work" used in that publication is defined as follows. A cutting element on the blades during drilling operations cuts the earth formation through a combination of axial penetration and lateral scraping. The movement of the cutting element through the formation can thus be separated into a "lateral scraping" component and an "axial crushing" component. The distance that the cutting element moves laterally, that is, in the plane of the bottom of the wellbore, is called the lateral displacement. The distance that the cutting element moves in the axial direction is called the vertical displacement. The force vector acting on the cutting element can also be characterized by a lateral force component acting in the plane of the bottom of the wellbore and a vertical force component acting along the axis of the drill bit. The work done by a cutting element is defined as the product of the force required to move the cutting element and the displacement of the cutting element in the direction of the force.

Thus, the lateral work done by the cutting element is the product of the lateral force and the lateral displacement. Similarly, the vertical (axial) work done is the product of the vertical force and the vertical displacement. The total work done by each cutting element can be calculated by summing the vertical work and the lateral work. Summing the total work done by each cutting element on any one blade will provide the total work done by that blade.

Force balancing and work balancing may also refer to a substantial balancing of forces and work between corresponding cutting elements, between redundant cutting elements, etc. Balancing may also be performed over the entire hole opener (e.g., over the entire cutting structure).

What is still needed, however, are methods for coupling the behavior of drill bits, hole openers, and other tools to one another in order to optimize the drilling performance of a BHA assembly.

SUMMARY OF INVENTION

In one aspect, the invention provides a method for reducing vibration occurring in a bottom hole assembly. In one aspect, the method includes simulating a vibration of a drill bit coupled with a vibration of at least one other drilling tool, determining an initial total vibration, moving a location of the at least one other drilling tool, determining a total vibration, and repeating the moving and determining until the total vibration is less than a selected criterion.

In another aspect, the invention provides a method of dynamically balancing a hole enlargement system. The method includes modeling the hole enlargement system based on input parameters, simulating the hole enlargement system, adjusting one or more of the input parameters, and repeating the modeling, simulating, and adjusting until a balanced condition is met.

In another aspect, the invention provides a method of analyzing drilling performance. In one aspect, the method includes simulating a drill bit that is mathematically coupled to at least one other drilling tool, determining at least one performance parameter, and outputting the at least one performance parameter.

In another aspect, the invention provides a method of graphically displaying a bottom hole assembly. In one aspect, the method includes simulating a drill bit that is mathematically coupled to at least one other drilling tool, and graphically displaying at least one aspect of the simulating.

Other aspects and advantages of the invention will be apparent from the following description and the appended claims.

DETAILED DESCRIPTION

The present invention relates to a simulation method and/or selection tool wherein the detailed interaction of the drill bit with the bottomhole surface during drilling is considered in conjunction with hole openers, or any other cutting tool used during the drilling of earth formation. Specific embodiments of the present invention relate to methods for calculating and simulating the combined axial, torsional, and/or lateral vibrations of at least one hole opener and a drill bit.

Figure 4:
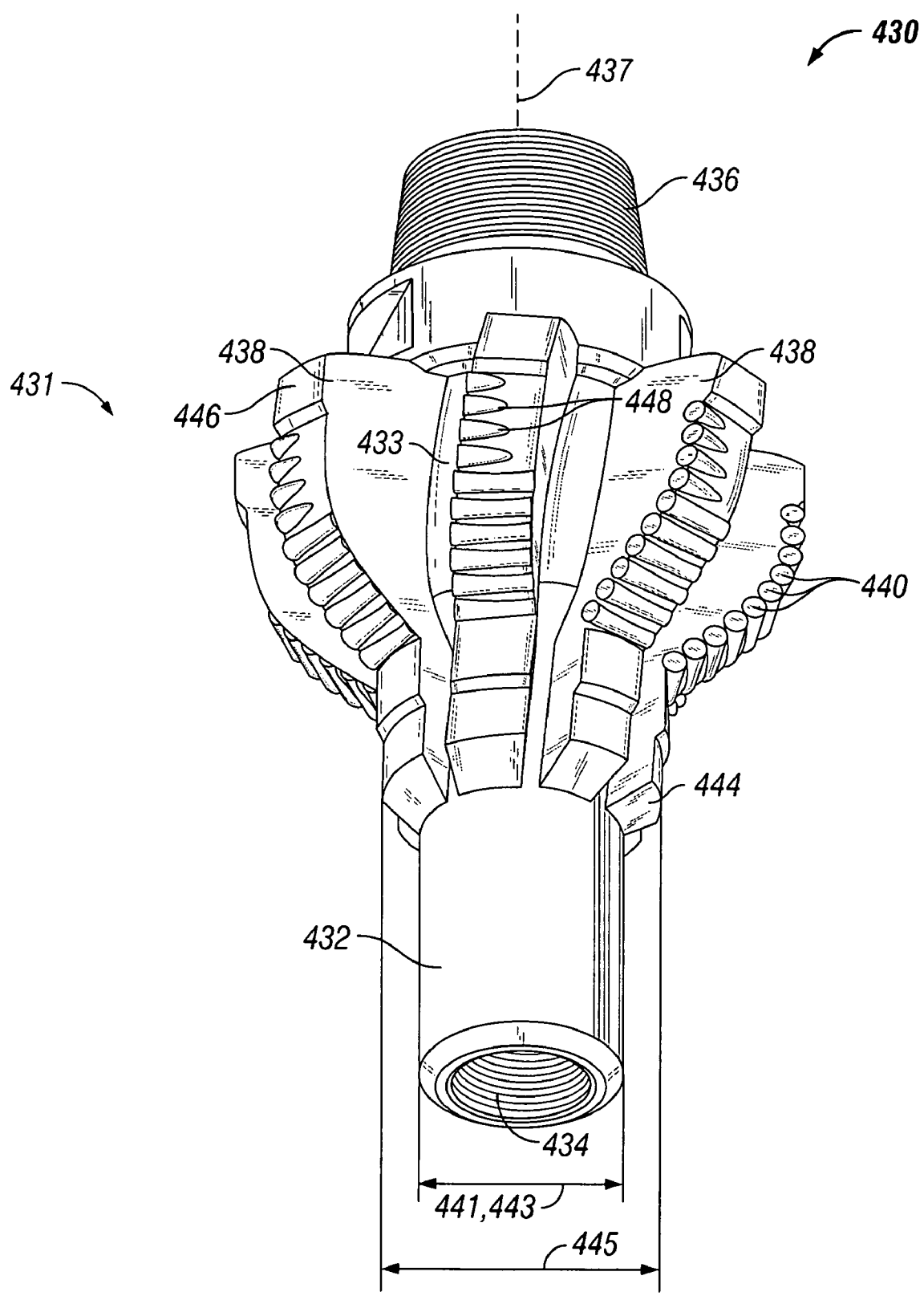
FIG. 4 shows a perspective view of an embodiment of the invention.

FIG. 4 shows a general configuration of a hole opener 430 that may be used in embodiments of the present invention. The hole opener 430 includes a tool body 432 and a plurality of blades 438 disposed at selected azimuthal locations about a circumference thereof. The hole opener 430 generally comprises connections 434, 436 (e.g., threaded connections) so that the hole opener 430 may be coupled to adjacent drilling tools that comprise, for example, a drillstring and/or bottom hole assembly (BHA) (not shown). The tool body 432 generally includes a bore (35 in FIG. 4) therethrough so that drilling fluid may flow through the hole opener 430 as it is pumped from the surface (e.g., from surface mud pumps (not shown)) to a bottom of the wellbore (not shown). The tool body 432 may be formed from steel or from other materials known in the art. For example, the tool body 432 may also be formed from a matrix material infiltrated with a binder alloy.

The blades 438 shown in FIG. 4 are spiral blades and are generally positioned asymmetrically at substantially equal angular intervals about the perimeter of the tool body 432 so that the hole opener 430 will be positioned substantially concentric with the wellbore (not shown) during drilling operations (e.g., a longitudinal axis 437 of the well opener 430 will remain substantially coaxial with a longitudinal axis of the wellbore (not shown)). Alternatively, the hole opener may be eccentric.

Other blade arrangements may be used with the invention, and the embodiment shown in FIG. 4 is not intended to limit the scope of the invention. For example, the blades 438 may be positioned symmetrically about the perimeter of the tool body 432 at substantially equal angular intervals so long as the hole opener 430 remains positioned substantially concentric with the wellbore (not shown) during drilling operations. Moreover, the blades 438 may be straight instead of spiral.

The blades 438 each typically include a plurality of cutting elements 440 disposed thereon, and the blades 438 and the cutting elements 440 generally form a cutting structure 431 of the hole opener 430. The cutting elements 440 may be, for example, polycrystalline diamond compact (PDC) inserts, tungsten carbide inserts, boron nitride inserts, and other similar inserts known in the art. The cutting elements 440 are generally arranged in a selected manner on the blades 438 so as to drill a wellbore having a larger diameter than, for example, a diameter of a wellbore (not shown) previously drilled with a drill bit. For example, FIG. 4 shows the cutting elements 440 arranged in a manner so that a diameter subtended by the cutting elements 440 gradually increases with respect to an axial position of the cutting elements 440 along the blades 438 (e.g., with respect to an axial position along the hole opener 430). Note that the subtended diameter may be selected to increase at any rate along a length of the blades 438 so as to drill a desired increased diameter wellbore (not shown).

In other embodiments, the blades 438 may be formed from a diamond impregnated material. In such embodiments, the diamond impregnated material of the blades 438 effectively forms the cutting structure 431. Moreover, such embodiments may also have gage protection elements as described below. Accordingly, embodiments comprising cutting elements are not intended to limit the scope of the invention.

The hole opener 430 also generally includes tapered surfaces 444 formed proximate a lower end of the blades 438. The tapered surfaces 444 comprise a lower diameter 443 that may be, for example, substantially equal to a diameter 441 of the tool body 432. However, in other embodiments, the lower diameter 443 may be larger than the diameter 441 of the tool body 432. The tapered surfaces 444 also comprise an upper diameter 445 that may, in some embodiments, be substantially equal to a diameter of the wellbore (not shown) drilled by a drill bit (not shown) positioned below the hole opener 430 in the drillstring (not shown). In other embodiments, the upper diameter 445 may be selected so as to be less than the diameter of the wellbore (not shown) drilled by the drill bit (not shown). Note that the tapered surfaces are not intended to be limiting.

In some embodiments, the tapered surfaces 444 may also include at least one cutting element disposed thereon. As described above, the cutting elements may comprise polycrystalline diamond compact (PDC) inserts, tungsten carbide inserts, boron nitride inserts, and other similar inserts known in the art. The cutting elements may be selectively positioned on the tapered surfaces 444 so as to drill out an existing pilot hole (not shown) if, for example, an existing pilot hole (not shown) is undersize.

The hole opener 430 also comprises gage surfaces 446 located proximate an upper end of the blades 438. The gage surfaces 446 shown in the embodiment of FIG. 4 are generally spiral gage surfaces formed on an upper portion of the spiral blades 438. However, other embodiments may comprise substantially straight gage surfaces.

In other embodiments, the cutting elements (440 in FIG. 4) may comprise different diameter cutting elements. For example, 13 mm cutting elements are commonly used with PDC drill bits. The cutting elements disposed on the blades (438 in FIG. 4) may comprise, for example, 9 mm, 11 mm, 13 mm, 16 mm, 19 mm, 22 mm, and/or 25 mm cutters, among other diameters. Further, different diameter cutting elements may be used on a single blade (e.g., the diameter of cutting elements maybe selectively varied along a length of a blade).

In another aspect of the invention, the cutting elements (440 in FIG. 4) may be positioned at selected backrake angles. A common backrake angle used in, for example, prior art PDC drill bits is approximately 20 degrees. However, the cutting elements in various embodiments according to this aspect of the invention may be positioned at backrake angles of greater than or less than 20 degrees. Moreover, the backrake angle of the cutting elements may be varied on the same blade or bit. In one embodiment, the backrake angle is variable along the length of the blade. In a particular embodiment, the backrake angle of each cutting element is related to the axial position of the particular cutting element along the length of the blade.

In some embodiments, the blades (438 in FIG. 4) and/or other portions of the cutting structure (431 in FIG. 4) may be formed from a non-magnetic material such as monel. In other embodiments, the blades (438 in FIG. 4) and/or other portions of the cutting structure (431 in FIG. 4) may be formed from materials that include a matrix infiltrated with binder materials. Examples of these infiltrated materials may be found in, for example, U.S. Pat. No. 4,630,692 issued to Ecer and U.S. Pat. No. 5,733,664 issued to Kelley et al. Such materials are advantageous because they are highly resistant to erosive and abrasive wear, yet are tough enough to withstand shock and stresses associated with harsh drilling conditions.

Figure 1:
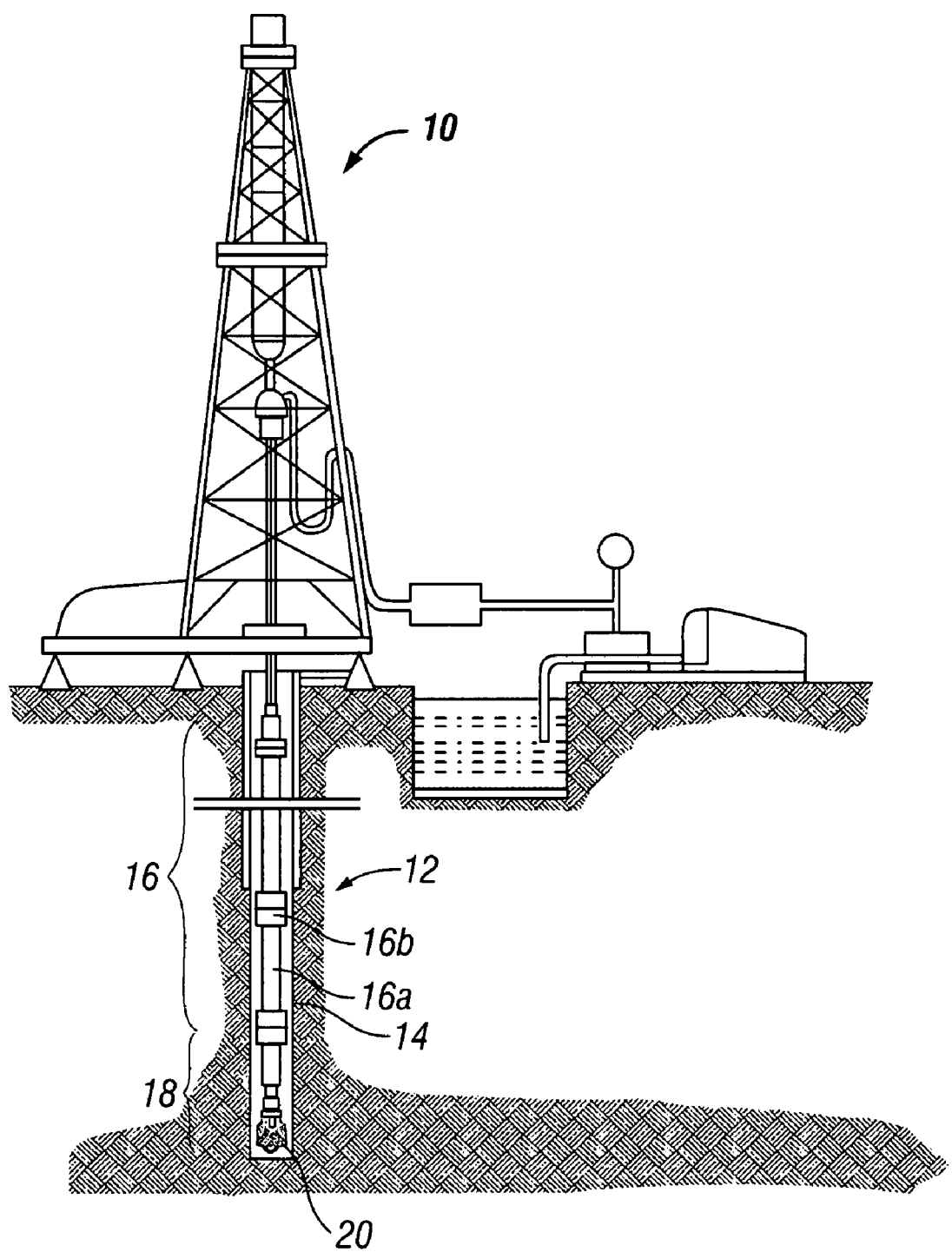
FIG. 1 shows a conventional drilling system for drilling an earth formation.
Figure 2:
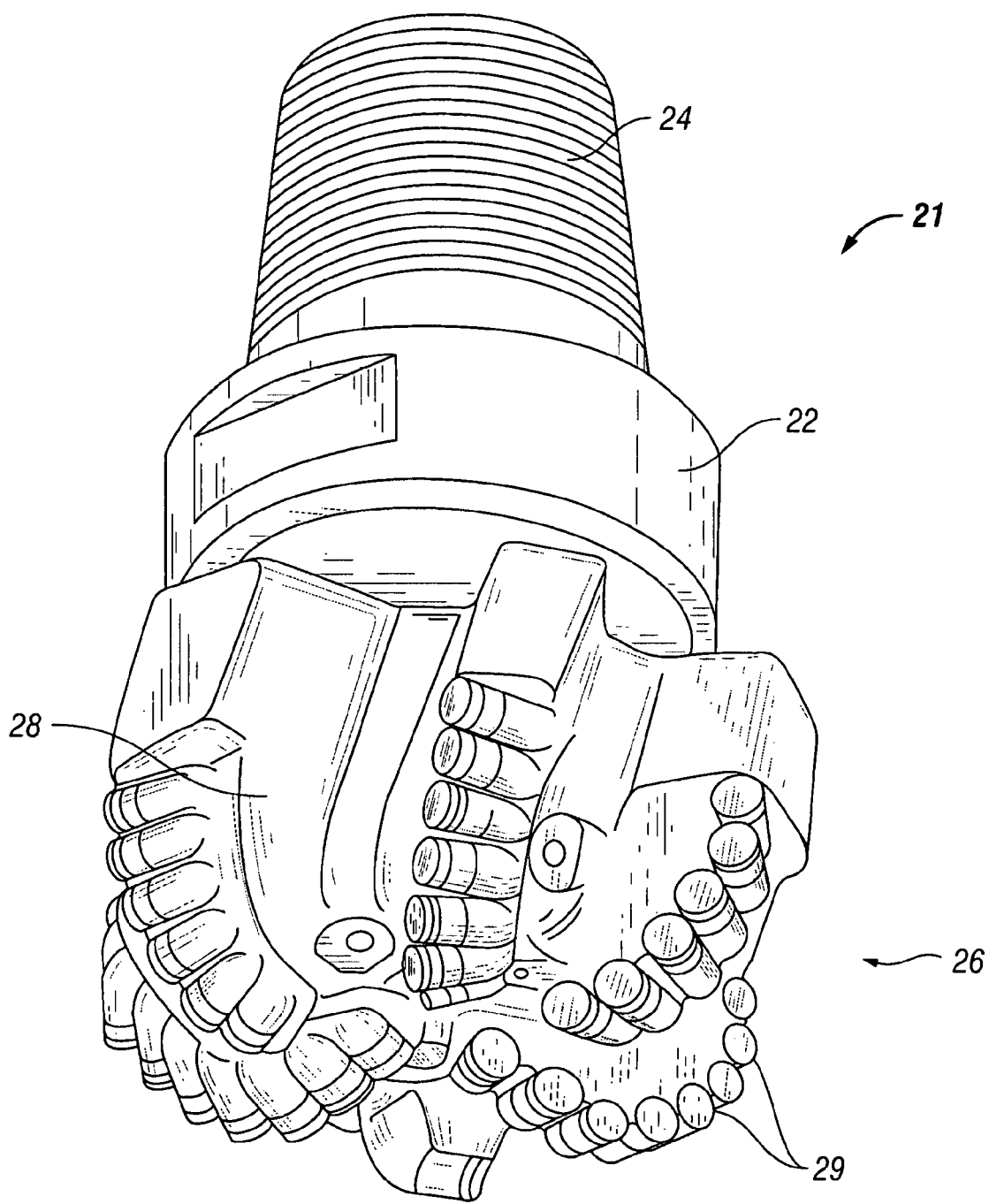
FIG. 2 shows a conventional fixed-cutter bit.
Figure 3:
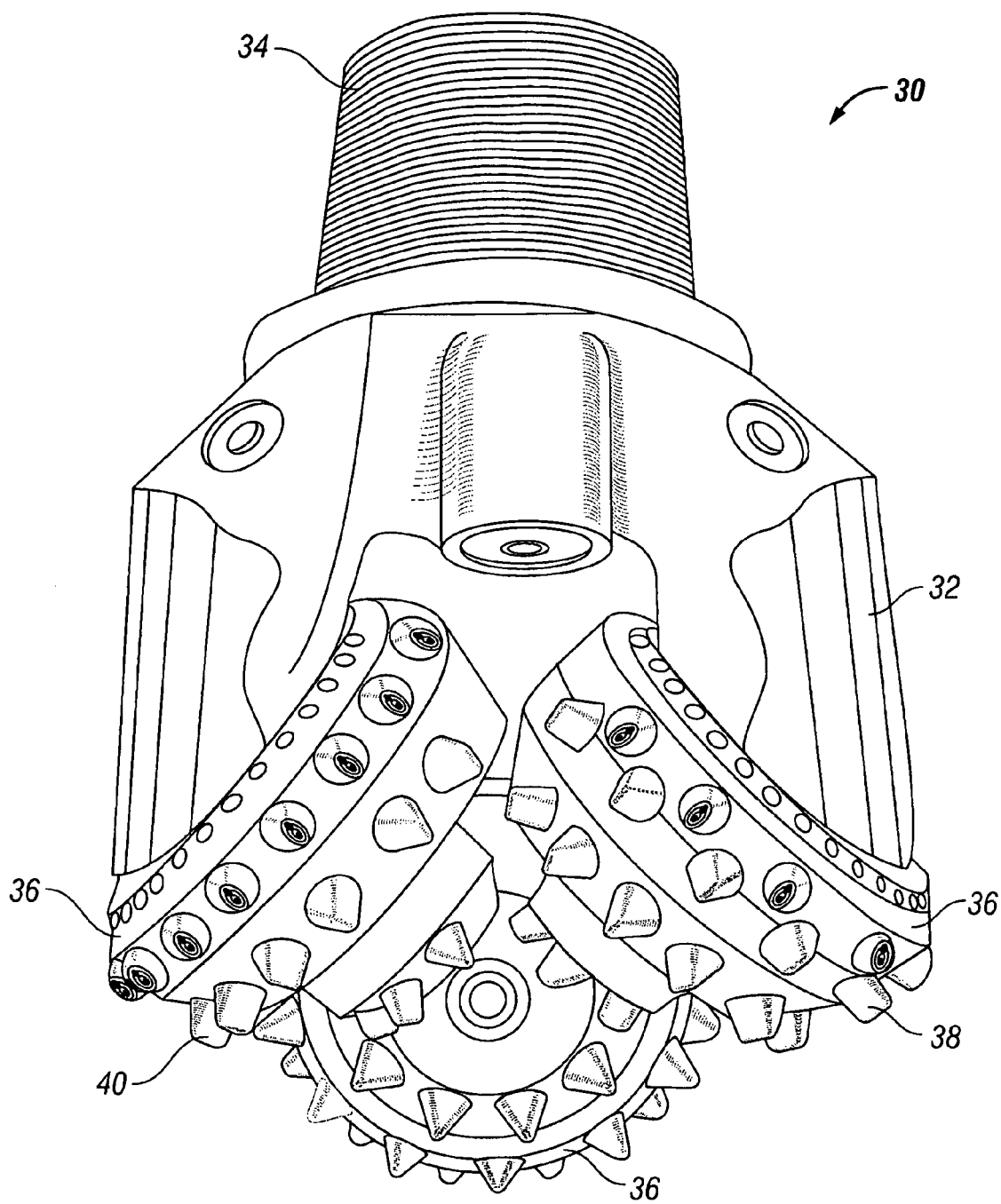
FIG. 3 shows a conventional roller cone bit.

Exemplary drill bits for use with embodiments of the present invention are shown in FIGS. 2 and 3. Examples of simulation methods for drill bits are provided in U.S. Pat. No. 6,516,293, entitled "Method for Simulating Drilling of Roller Cone Bits and its Application to Roller Cone Bit Design and Performance," and U.S. Provisional Application No. 60/485,642, filed Jul. 9, 2003 and entitled "Methods for Modeling, Designing, and Optimizing Fixed Cutter Bits," which are both assigned to the assignee of the present invention and now incorporated herein by reference in their entirety.

As noted above, embodiments of the present invention build upon the simulation techniques disclosed in the incorporated drill bit patents and patent applications to couple the cutting action of other cutting tools in a BHA.

Method of Dynamically Simulating Bit/Cutting Tool/BHA

Figure 5:
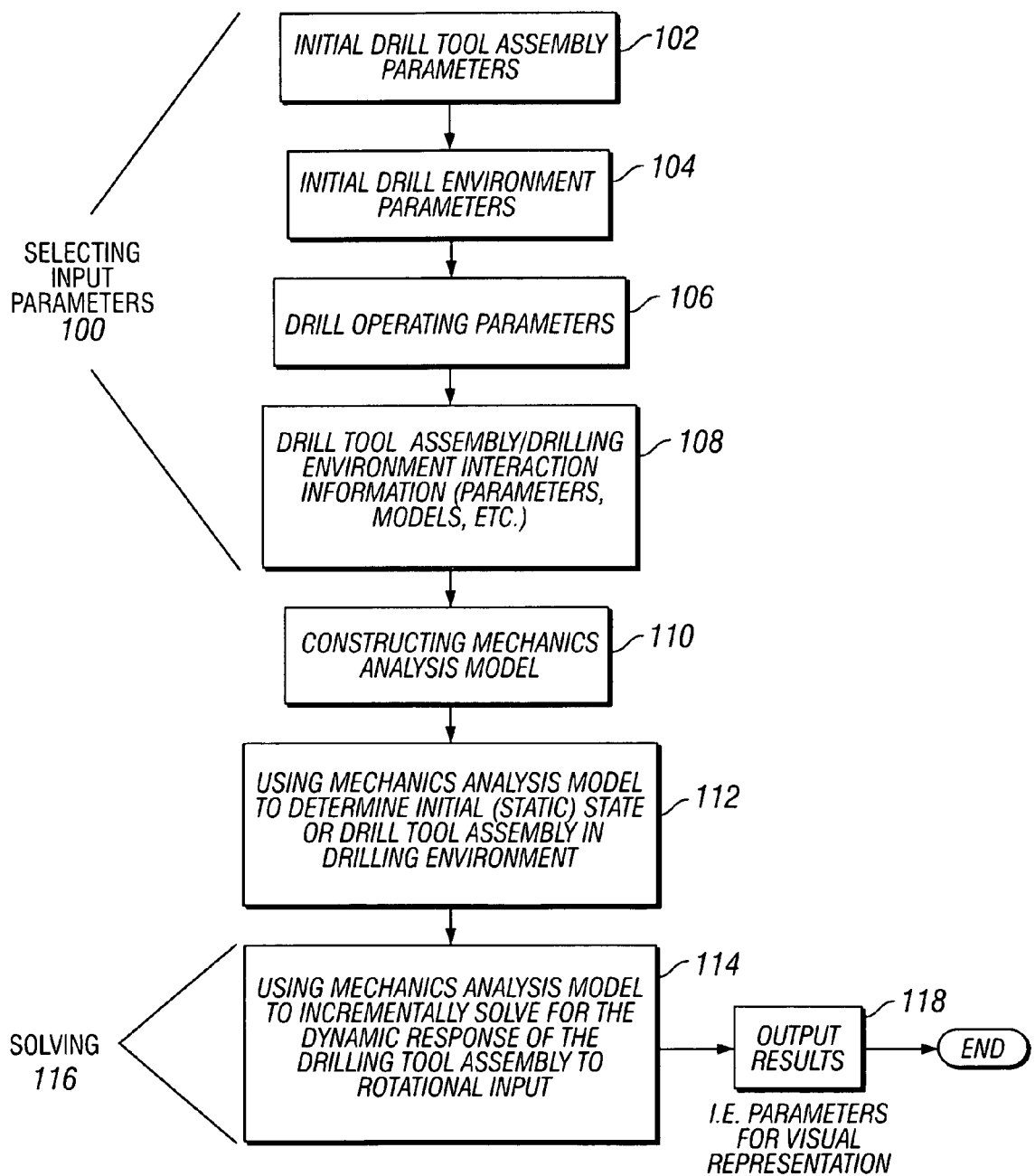
FIG. 5 shows a flow chart of one embodiment of a method for simulating the dynamic response of a drilling tool assembly.

A flow chart for one embodiment of the invention is illustrated in FIG. 5. The first step in this embodiment is selecting (defining or otherwise providing) in part parameters 100, including initial drilling tool assembly parameters 102, initial drilling environment parameters 104, drilling operating parameters 106, and drilling tool assembly/drilling environment interaction information (parameters and/or models) 108. The step involves constructing a mechanics analysis model of the drilling tool assembly 110. The mechanics analysis model can be constructed using the drilling tool assembly parameters 102 and Newton's law of motion. The next step involves determining an initial static state of the drilling tool assembly 112 in the selected drilling environment using the mechanics analysis model 110 along with drilling environment parameters 104 and drilling tool assembly/drilling environment interaction information 108.

Once the mechanics analysis model is constructed and an initial static state of the drill string is determined, the resulting state parameters can be used with the drilling operating parameters 106 to incrementally solve for the dynamic response 114 of the drilling tool assembly to rotational input from the rotary table and the hook load provided at the hook. Once a simulated response for an increment in time (or for the total time) is obtained, results from the simulation can be provided as output 118, and used to generate a visual representation of drilling if desired.

Figure 6:
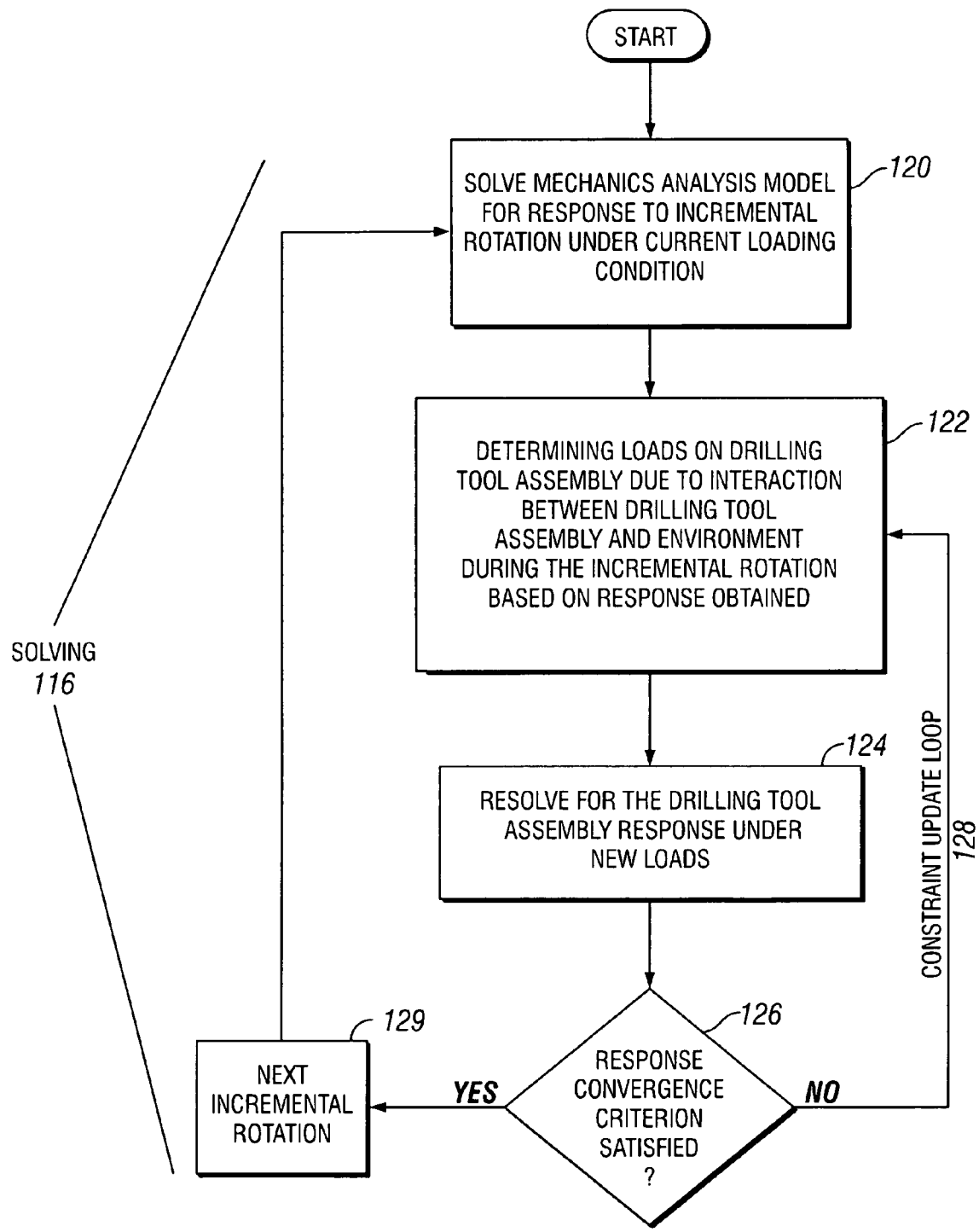
FIG. 6 shows a flow chart of one embodiment of a method of incrementally solving for the dynamic response of a drilling tool assembly.

In one example, illustrated in FIG. 6, incrementally solving for the dynamic response (indicated as 116) may not only include solving the mechanics analysis model for the dynamic response to an incremental rotation, at 120, but may also include determining, from the response obtained, loads (e.g., drilling environment interaction forces) on the drilling tool assembly due to interaction between the drilling tool assembly and the drilling environment during the incremental rotation, at 122, and resolving for the response of the drilling tool assembly to the incremental rotation, at 124, under the newly determined loads. The determining and resolving may be repeated in a constraint update loop 128 until a response convergence criterion 126 is satisfied. Once a convergence criterion is satisfied, the entire incremental solving process 116 may be repeated for successive increments until an end condition for simulation is reached.

During the simulation, the constraint forces initially used for each new incremental calculation step may be the constraint forces determined during the last incremental rotation. In the simulation, incremental rotation calculations are repeated for a select number of successive incremental rotations until an end condition for simulation is reached. A more detailed example of an embodiment of the invention is shown in FIG. 7

Figure 7:
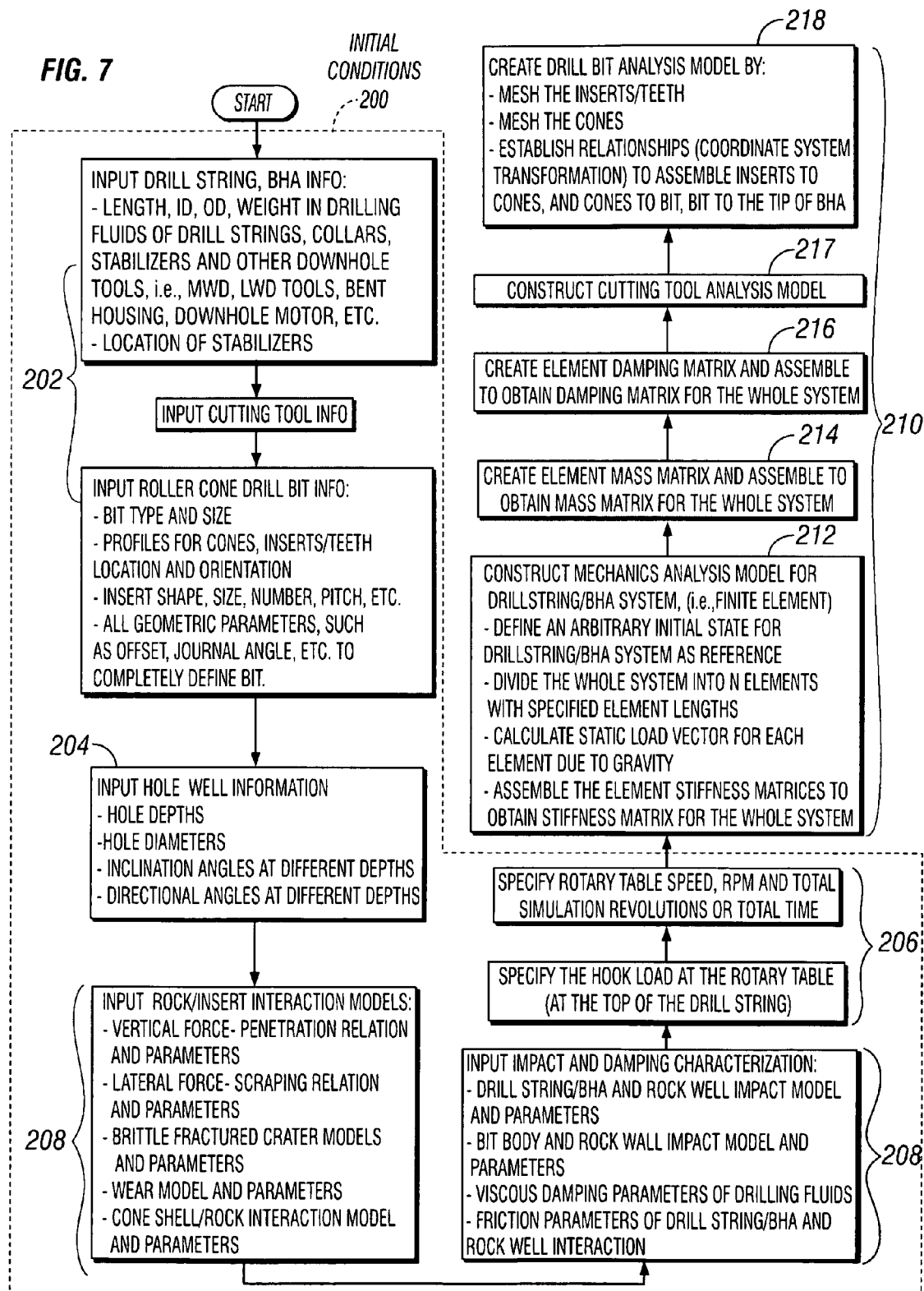
FIG. 7 shows a more detailed flow chart of one embodiment of a method for incrementally solving for the dynamic response of a drilling tool assembly.

For the example shown in FIG. 7, the parameters provided as input (initial conditions) 200 include drilling tool assembly design parameters 202, initial drilling environment parameters 204, drilling operating parameters 206, and drilling tool assembly/drilling environment interaction parameters and/or models 208.

Drilling tool assembly design parameters 202 may include drill string design parameters, BHA design parameters, cutting tool parameters, and drill bit design parameters. In the example shown, the drill string comprises a plurality of joints of drill pipe, and the BHA comprises drill collars, stabilizers, bent housings, and other downhole tools (e.g., MWD tools, LWD, tools, downhole motor, etc.), and a drill bit. As noted above, while the drill bit, generally, is considered a part of the BHA, in this example the design parameters of the drill bit are shown separately to illustrate that any type of drill bit may be defined and modeled using any drill bit analysis model.

Drill string design parameters include, for example, the length, inside diameter (ID), outside diameter (OD), weight (or density), and other material properties of the drill string in the aggregate. Alternatively, drill string design parameters may include the properties of each component of the drill string and the number of components and location of each component of the drill string. For example, the length, ID, OD, weight, and material properties of one joint of drill pipe may be provided along with the number of joints of drill pipe which make up the drill string. Material properties used may include the type of material and/or the strength, elasticity, and density of the material. The weight of the drill string, or individual components of the drill string may be provided as "weight in drilling fluids" (the weight of the component when submerged in the selected drilling fluid).

BHA design parameters include, for example, the bent angle and orientation of the motor, the length, equivalent inside diameter (ID), outside diameter (OD), weight (or density), and other material properties of each of the various components of the BHA. In this example, the drill collars, stabilizers, and other downhole tools are defined by their lengths, equivalent IDs, ODs, material properties, weight in drilling fluids, and position in the drilling tool assembly.

Cutting tool design parameters include, for example, the material properties and the geometric parameters of the cutting tool. Geometric parameters of the cutting tool may include size of the tool, number of blades, location of blades, expandable nature, number of cutting elements, and the location, shape, size, and orientation of the cutting elements.

The drill bit design parameters include, for example, the bit type (roller cone, fixed-cutter, etc.) and geometric parameters of the bit. Geometric parameters of the bit may include the bit size (e.g., diameter), number of cutting elements, and the location, shape, size, and orientation of the cutting elements. In the case of a roller cone bit, drill bit design parameters may further include cone profiles, cone axis offset (offset from perpendicular with the bit axis of rotation), the number of cutting elements on each cone, the location, size, shape, orientation, etc. of each cutting element on each cone, and any other bit geometric parameters (e.g., journal angles, element spacings, etc.) to completely define the bit geometry. In general, bit, cutting element, and cone geometry may be converted to coordinates and provided as input. One preferred method for obtaining bit design parameters is the use of 3-dimensional CAD solid or surface models to facilitate geometric input. Drill bit design parameters may further include material properties, such as strength, hardness, etc. of components of the bit.

Initial drilling environment parameters 204 include, for example, wellbore parameters. Wellbore parameters may include wellbore trajectory (or geometric) parameters and wellbore formation parameters. Wellbore trajectory parameters may include an initial wellbore measured depth (or length), wellbore diameter, inclination angle, and azimuth direction of the wellbore trajectory. In the typical case of a wellbore comprising segments having different diameters or differing in direction, the wellbore trajectory information may include depths, diameters, inclination angles, and azimuth directions for each of the various segments. Wellbore trajectory information may further include an indication of the curvature of the segments (which may be used to determine the order of mathematical equations used to represent each segment). Wellbore formation parameters may include the type of formation being drilled and/or material properties of the formation such as the formation strength, hardness, plasticity, and elastic modulus.

Those skilled in the art will appreciate that any drill string design parameter may be adjusted in the model. Moreover, in selected embodiments of the model, the assembly may be considered to be segmented into a primary cutting tool, first BHA segment, secondary cutting tool, second BHA segment, etc.

Drilling operating parameters 206, in this embodiment, include the rotary table speed at which the drilling tool assembly is rotated (RPM), the downhole motor speed if a downhole motor is included, and the hook load. Drilling operating parameters 206 may further include drilling fluid parameters, such as the viscosity and density of the drilling fluid, for example. It should be understood that drilling operating parameters 206 are not limited to these variables. In other embodiments, drilling operating parameters 206 may include other variables, such as, for example, rotary torque and drilling fluid flow rate. Additionally, drilling operating parameters 206 for the purpose of simulation may further include the total number of bit revolutions to be simulated or the total drilling time desired for simulation. However, it should be understood that total revolutions and total drilling time are simply end conditions that can be provided as input to control the stopping point of simulation, and are not necessary for the calculation required for simulation. Additionally, in other embodiments, other end conditions may be provided, such as total drilling depth to be simulated, or by operator command, for example.

Drilling tool assembly/drilling environment interaction information 208 includes, for example, cutting element/earth formation interaction models (or parameters) and drilling tool assembly/formation impact, friction, and damping models and/or parameters. Cutting element/earth formation interaction models may include vertical force-penetration relations and/or parameters which characterize the relationship between the axial force of a selected cutting element on a selected formation and the corresponding penetration of the cutting element into the formation. Cutting element/earth formation interaction models may also include lateral force-scraping relations and/or parameters which characterize the relationship between the lateral force of a selected cutting element on a selected formation and the corresponding scraping of the formation by the cutting element.

Cutting element/formation interaction models may also include brittle fracture crater models and/or parameters for predicting formation craters which will likely result in brittle fracture, wear models and/or parameters for predicting cutting element wear resulting from contact with the formation, and cone shell/formation or bit body/formation interaction models and/or parameters for determining forces on the bit resulting from cone shell/formation or bit body/formation interaction. One example of methods for obtaining or determining drilling tool assembly/formation interaction models or parameters can be found in the previously noted U.S. Pat. No. 6,516,293, assigned to the assignee of the present invention and incorporated herein by reference. Other methods for modeling drill bit interaction with a formation can be found in the previously noted SPE Papers No. 29922, No. 15617, and No. 15618, and PCT International Publication Nos. WO 00/12859 and WO 00/12860.

Drilling tool assembly/formation impact, friction, and damping models and/or parameters characterize impact and friction on the drilling tool assembly due to contact with the wall of the wellbore and the viscous damping effects of the drilling fluid. These models/parameters include, for example, drill string-BHA/formation impact models and/or parameters, bit body/formation impact models and/or parameters, drill string-BHA/formation friction models and/or parameters, and drilling fluid viscous damping models and/or parameters. One skilled in the art will appreciate that impact, friction and damping models/parameters may be obtained through laboratory experimentation, in a method similar to that disclosed in the prior art for drill bits interaction models/parameters. Alternatively, these models may also be derived based on mechanical properties of the formation and the drilling tool assembly, or may be obtained from literature. Prior art methods for determining impact and friction models are shown, for example, in papers such as the one by Yu Wang and Matthew Mason, entitled "Two-Dimensional Rigid-Body Collisions with Friction", Journal of Applied Mechanics, September 1992, Vol. 59, pp. 635-642.

As shown in FIGS. 6-7, once input parameters/models 200 are selected, determined, or otherwise provided, a multi-part mechanics analysis model of the drilling tool assembly is constructed (at 210) and used to determine the initial static state (at 112 in FIG. 6) of the drilling tool assembly in the wellbore. The first part of the mechanics analysis model 212 takes into consideration the overall structure of the drilling tool assembly, with the drill bit, and any cutting tools being only generally represented.

In this embodiment, for example, a finite element method may be used wherein an arbitrary initial state (such as hanging in the vertical mode free of bending stresses) is defined for the drilling tool assembly as a reference and the drilling tool assembly is divided into N elements of specified element lengths (i.e., meshed). The static load vector for each element due to gravity is calculated.

Then element stiffness matrices are constructed based on the material properties (e.g., elasticity), element length, and cross sectional geometrical properties of drilling tool assembly components provided as input and are used to construct a stiffness matrix, at 212, for the entire drilling tool assembly (wherein the drill bit may be generally represented by a single node). Similarly, element mass matrices are constructed by determining the mass of each element (based on material properties, etc.) and are used to construct a mass matrix, at 214, for the entire drilling tool assembly.

Additionally, element damping matrices can be constructed (based on experimental data, approximation, or other method) and used to construct a damping matrix, at 216, for the entire drilling tool assembly. Methods for dividing a system into finite elements and constructing corresponding stiffness, mass, and damping matrices are known in the art and thus are not explained in detail here. Examples of such methods are shown, for example, in "Finite Elements for Analysis and Design" by J. E. Akin (Academic Press, 1994).

Furthermore, it will be noted that spaces between a secondary cutting structure (hole opener for example) and a bit may be accurately modeled.

The second part 217 of the mechanics analysis model 210 of the drilling tool assembly is a mechanics analysis model of the at least one cutting tool 217, which takes into account details of one or more cutting tools. The cutting tool mechanics analysis model 217 may be constructed by creating a mesh of the cutting elements and blades of the tool, and establishing a coordinate relationship (coordinate system transformation) between the cutting elements and the blades, between the blades and the tip of the BHA.

The third part 218 of the mechanics analysis model 210 of the drilling tool assembly is a mechanics analysis model of the drill bit, which takes into account details of selected drill bit design. The drill bit mechanics analysis model 218 is constructed by creating a mesh of the cutting elements and cones (for a roller cone bit) of the bit, and establishing a coordinate relationship (coordinate system transformation) between the cutting elements and the cones, between the cones and the bit, and between the bit and the tip of the BHA.

Once the (three-part) mechanics analysis model for the drilling tool assembly is constructed 210 (using Newton's second law) and wellbore constraints specified, the mechanics model and constraints can be used to determine the constraint forces on the drilling tool assembly when forced to the wellbore trajectory and bottomhole from its original "stress free" state. Such a methodology is disclosed for example, in U.S. Pat. No. 6,785,641, which is incorporated by reference in its entirety.

Once a dynamic response conforming to the borehole wall constraints is determined (using the methodology disclosed in the '641 patent for example) for an incremental rotation, the constraint loads on the drilling tool assembly due to interaction with the bore hole wall and the bottomhole during the incremental rotation are determined.

As noted above, output information from a dynamic simulation of a drilling tool assembly drilling an earth formation may include, for example, the drilling tool assembly configuration (or response) obtained for each time increment, and corresponding bit forces, cone forces, cutting element forces, impact forces, friction forces, dynamic WOB, resulting bottomhole geometry, etc. This output information may be presented in the form of a visual representation (indicated at 118 in FIG. 5), such as a visual representation of the borehole being drilled through the earth formation with continuous updated bottomhole geometries and the dynamic response of the drilling tool assembly to drilling, on a computer screen. Alternatively, the visual representation may include graphs of parameters provided as input and/or calculated during the simulation, such as lateral and axial displacements of the tools/bits during simulated drilling.

For example, a time history of the dynamic WOB or the wear of cutting elements during drilling may be presented as a graphic display on a computer screen. It should be understood that the invention is not limited to any particular type of display. Further, the means used for visually displaying aspects of simulated drilling is a matter of convenience for the system designer, and is not intended to limit the invention.

The example described above represents only one embodiment of the invention. Those skilled in the art will appreciate that other embodiments can be devised which do not depart from the scope of the invention as disclosed herein. For example, an alternative method can be used to account for changes in constraint forces during incremental rotation. For example, instead of using a finite element method, a finite difference method or a weighted residual method can be used to model the drilling tool assembly. Similarly, other methods may be used to predict the forces exerted on the bit as a result of bit/cutting element interaction with the bottomhole surface. For example, in one case, a method for interpolating between calculated values of constraint forces may be used to predict the constraint forces on the drilling tool assembly. Similarly, a different method of predicting the value of the constraint forces resulting from impact or frictional contact may be used.

Further, a modified version of the method described above for predicting forces resulting from cutting element interaction with the bottomhole surface may be used. These methods can be analytical, numerical (such as finite element method), or experimental. Alternatively, methods such as disclosed in SPE Paper No. 29922 noted above or PCT Patent Application Nos. WO 00/12859 and WO 00/12860 may be used to model roller cone drill bit interaction with the bottomhole surface, or methods such as disclosed in SPE papers no. 15617 and no. 15618 noted above may be used to model fixed-cutter bit interaction with the bottomhole surface if a fixed-cutter bit is used.

Method of Dynamically Simulating Cutting Tool/Bit

Some embodiments of the invention provide methods for analyzing drill string assembly or drill bit vibrations during drilling. In one embodiment, vibrational forces acting on the bit and the cutting tool may be considered as frequency response functions (FRF), which may be derived from measurements of an applied dynamic force along with the vibratory response motion, which could be displacement, velocity, or acceleration. For example, when a vibratory force, f(t), is applied to a mass (which may be the bit or the hole opener), the induced vibration displacement, x(t) may be determined. The FRF may be derived from the solution of the differential equation of motion for a single degree of freedom (SDOF) system. This equation is obtained by setting the sum of forces acting on the mass equal to the product of mass times acceleration (Newton's second law):

$$f(t) + c\frac{dx(t)}{dt} + kx(t) = m\frac{d^2x(t)}{dt^2} \tag{1}$$

where:
f(t)=time-dependent force (lb.)
x(t)=time-dependent displacement (in.)
m=system mass
k=spring stiffness (lb.-in.)
c=viscous damping (lb./in./s)

The FRF is a frequency domain function, and it is derived by first taking the Fourier transform of Equation (1). One of the benefits of transforming the time-dependent differential equation is that a fairly easy algebraic equation results, owing to the simple relationship between displacement, velocity, and acceleration in the frequency domain. These relationships lead to an equation that includes only the displacement and force as functions of frequency. Letting $F(\omega)$ represent the Fourier transform of force and $X(\omega)$ represent the transform of displacement:

$$(-\omega^2 m + ic\omega + k)X(\omega) = F(\omega) \tag{2}$$

The circular frequency, $\omega$, is used here (radians/s). The damping term is imaginary, due to the 90° phase shift of velocity with respect to displacement for sinusoidal motion. FRF may be obtained by solving for the displacement with respect to the force in the frequency domain. The FRF is usually indicated by the notation, $h(\omega)$:

$$h(\omega) = \frac{1}{-\omega^2 m + ic\omega + k} \tag{3}$$

Some key parameters in Equation 3 may be defined as follows:

$$h(\omega) = \frac{(1-\beta^2) - 2i\varsigma\beta}{-m\omega_r^2[(1-\beta^2)^2 + 4\varsigma^2\beta^2]} \tag{4}$$

This form of the FRF allows one to recognize the real and imaginary parts separately. The new parameters introduced in Equation (4) are the frequency ratio, $\beta=\omega/\omega_r$, and the damping factor, $\varsigma$, wherein $\omega_r$ is the resonance frequency of the system. The resonance frequency depends on the system mass and stiffness:

$$\omega_r = \sqrt{k/m} \tag{5}$$

The above discussion pertains to single degree of freedom vibration theory. However, in the embodiments discussed herein, the cutting tools and bit act as a multiple degree of freedom system (MDOF) having many modes of vibration. The FRF for MDOF can be understood as a summation of SDOF FRFs, each having a resonance frequency, damping factor, modal mass, modal stiffness, and modal damping ratio.

A matrix of mode coefficients, $\Psi_{jr}$, represents all the mode shapes of interest of a structure. The mode coefficient index, j, locates a numbered position on the structure (a mathematical degree of freedom) and the index, r, indicates the mode shape number. Modes are numbered in accordance with increasing resonance frequencies. The vector component coordinate transformation from abstract modal coordinates, $\underline{X}$, to physical coordinates, X, is:

$$\{X\} = [\Psi]\{\underline{X}\} \tag{6}$$

Each column in the $[\Psi]$ matrix is a list of the mode coefficients describing a mode shape.

Now, any system having mass, stiffness and damping distributed throughout can be represented with matrices. Using them, a set of differential equations can be written. The frequency domain form is:

$$[-\omega^2[M] + i\omega[C] + [K]]\{X\} = \{F\} \tag{7}$$

Displacements and forces at the numbered positions on a structure appear as elements in column matrices. The mass, damping, and stiffness matrix terms are usually combined into a single dynamic matrix, [D]:

$$[D]\{X\} = \{F\} \tag{8}$$

A complete matrix, [H], of FRFs would be the inverse of the dynamic matrix. Thus, we have the relationship:

$$\{X\} = [H]\{F\} \tag{9}$$

Individual elements of the [H] matrix are designated with the notation, $h_{jk}(\omega)$, where the j index refers to the row (location of response measurement) and the k index to the column (location of force). A column of the [H] matrix may be obtained experimentally by applying a single force at a numbered point, k, on the structure while measuring the response motion at all n points on the structure, j=1, 2, 3 . . . n. The [H] matrix completely describes a structure dynamically. A one-time measurement of the [H] matrix defines the structure for all time—until a defect begins to develop. Then subtle changes crop up all over the [H] matrix. From linear algebra we have the transformation from the [H̲] matrix in modal coordinates to the physical [H] matrix.

$$[H]=[\Psi][\underline{H}][\Psi]^T \quad (10)$$

This provides an understanding of a measured FRF, $h_{jk}(\omega)$, as the superposition of modal FRFs. Equation (10) may be expanded for any element of the [H] matrix (selecting out a row and column) to obtain the result:

$$h_{jk}(\omega) = \sum_{r=1}^{N} \frac{\Psi_{jr}\Psi_{kr}}{m_r \omega_r^2} \left[ \frac{(1-\beta_r^2) - 2i\zeta_r\beta_r}{(1-\beta_r^2)^2 + 4\zeta_r^2\beta_r^2} \right] \quad (11)$$

In order to fully characterize the system, the distance between the two or more components (e.g., the drilling tool (hole opener) and the drill bit) may need to be considered as well as the coupled nature of the elements. For example, the hole opener and the bit may be considered to be masses $m_1$ and $m_2$ coupled via a spring. Those having ordinary skill in the art will appreciate that a number of computational techniques may be used to determine this interaction, and that no limitation on the scope of the present invention is intended thereby.

In another embodiment of the invention, the vibrational, torsional, axial, and/or lateral forces encountered by the hole opener and/or bit may be physically measured and stored in a database. In this embodiment, with respect to the drill bit for example, as explained in U.S. Pat. No. 6,516,293, a number of inserts can be tested against various formations of interest to determine the forces acting on the inserts. These forces may then be summed to yield the forces acting on the bit.

Similarly, strain gages, vibrational gages and/or other devices may be used to determine the force encountered by the bit or drilling tool under a given set of conditions. Those of ordinary skill in the art will further appreciate that a combination of theoretical and experimental approaches may be used in order to determine the forces acting on the bit and drilling tool (or tools).

In some embodiments, the driller may require that an angle be "built" ("build angle") into the well. A build angle is the rate that the direction of the longitudinal axis of the well bore changes, which is commonly measured in degrees per 100 feet. The extent of the build angle may also be referred to as the "dogleg severity." Another important directional aspect is the "walk" rate. The walk rate refers to the change in azimuthal (compass) direction of the well bore. Control and prediction of the drilling direction is important for reaching target zones containing hydrocarbons. In addition, the drop tendency of the bit/secondary cutting structures may be modeled. In one embodiment, methods in accordance with embodiments of the present application may be used to match the drop/walk tendency of a bit with the drop/walk tendency of secondary cutting structures. Alternatively, the axial locations of the components may be adjusted to achieve a desired effect on trajectory.

For such an embodiment, a drill bit used in accordance with an embodiment of the present invention may be similar to that disclosed in U.S. Pat. No. 5,937,958, which is assigned to the assignee of the present invention, and is incorporated by reference in its entirety.

Figure 8:
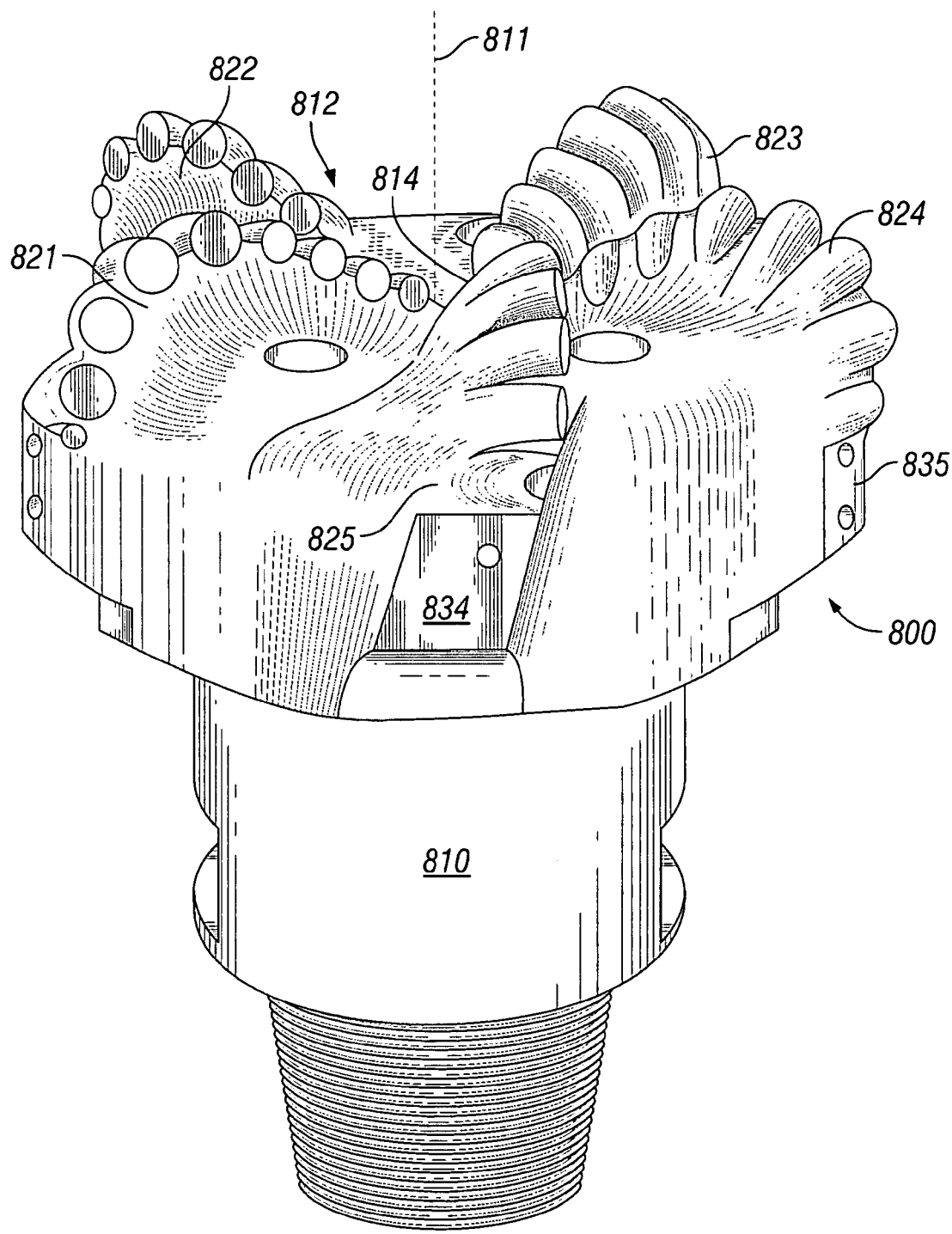
FIG. 8 shows a bit in accordance with an embodiment of the invention.
Figure 9:
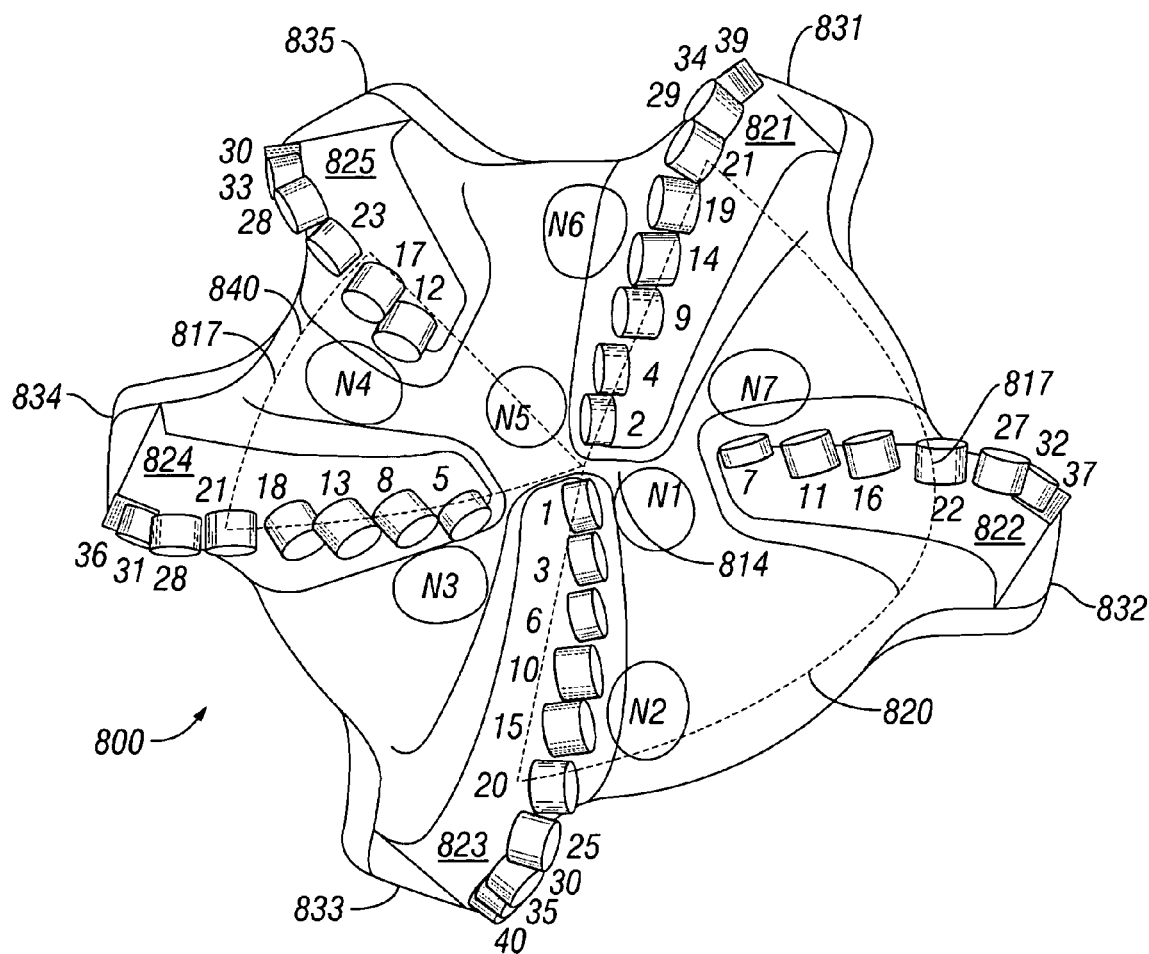
FIG. 9 shows a bit in accordance with an embodiment of the invention.

Referring initially to FIGS. 8 and 9, a PDC bit 500 typically comprises a generally cylindrical, one-piece body 810 having a longitudinal axis 811 and a conical cutting face 812 at one end. Face 812 includes a plurality of blades 821, 822, 823, 824 and 825 extending generally radially from the center of the cutting face 812. Each blade supports a plurality of PDC cutter elements as discussed in detail below. As best shown in FIG. 8, cutting face 812 has a central depression 814, a gage portion and a shoulder therebetween. The highest point (as drawn) on the cutter tip profiles defines the bit nose 817 (FIG. 9). This general configuration is well known in the art. Nevertheless, applicants have discovered that the walking tendencies of the bit can be enhanced and that a bit that walks predictably and precisely can be constructed by implementing several novel concepts. These novel concepts are set out in no particular order below and can generally be implemented independently of each other, although it is preferred that at least three be implemented simultaneously in order to achieve more satisfactory results. A preferred embodiment of the present invention entails implementation of multiple ones of the concepts described in detail below. The bit shown in FIGS. 8 and 9 is a 12¼ inch bit. It will be understood that the dimensions of various elements described below correspond to this 12¼ inch bit and that bits of other sizes can be constructed according to the same principles using components of different sizes to achieve similar results.

Active and Passive Zones

Referring again to FIGS. 8 and 9, the cutting face 812 of a bit constructed in accordance with the present invention includes an active zone 820 and a passive zone 840. Active zone 820 is a generally semi-circular zone defined herein as the portion of the bit face lying within the radius of nose 817 and extending from blade 821 to blade 823 and including the cutters of blades 821, 822 and 823. According to a preferred embodiment, active zone 820 spans approximately 120-180 degrees and preferably approximately 160 degrees. Passive zone 840 is a generally semi-circular zone defined herein as the portion of the bit face lying within the radius of nose 817 and extending from blade 824 to blade 825 and including the cutters of blades 824 and 825. According to a preferred embodiment, passive zone 840 spans approximately 50-90 degrees and preferably approximately 60 degrees.

Primary and Secondary Cutter Tip Profiles

Figure 10A:
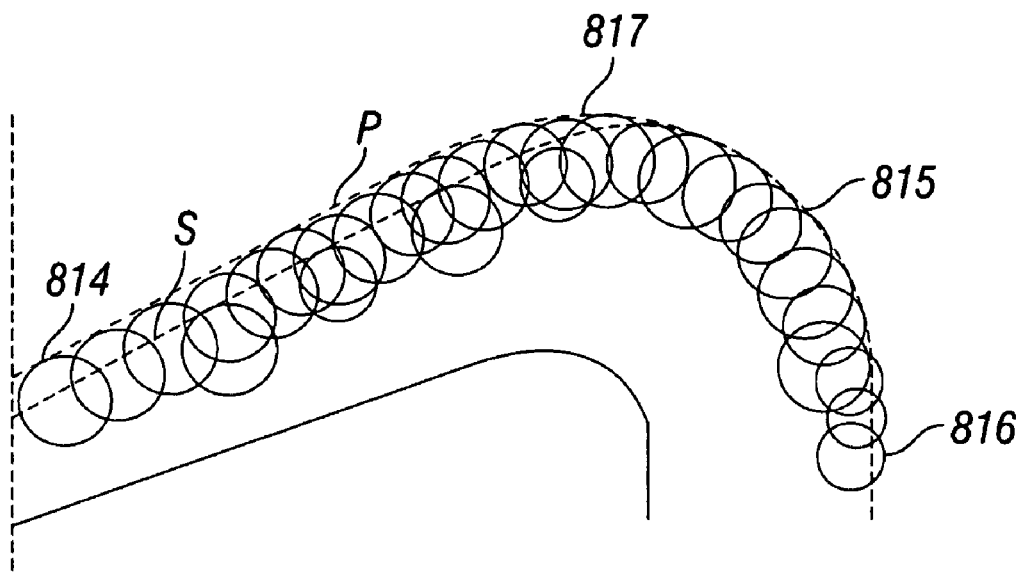
FIGS. 10A-10B show primary and secondary cutter tip profiles in accordance with an embodiment of the invention.
Figure 10B:
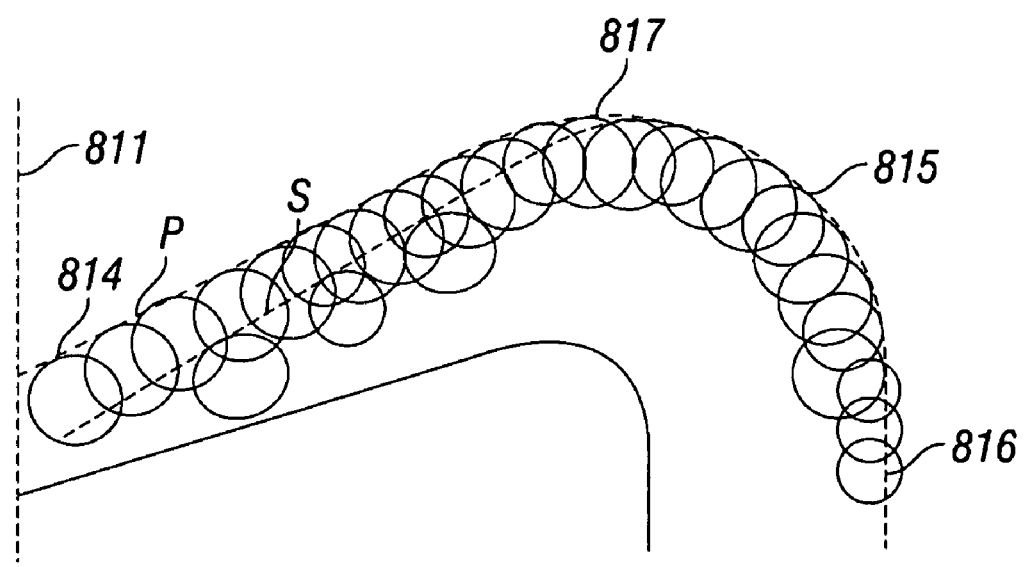

Referring now to FIG. 10, a primary cutter tip profile p that is used in the active zone and a secondary cutter tip profile s that is used in the passive zone are superimposed on one another. While the gage portions 816 of the two blades have similar profiles up to the bit nose 817, the secondary profile s drops away from the bit nose 817 more steeply toward the center of face 812 than does the primary profile p. According to a preferred embodiment, the tips of the cutters on blades 824 and 825 lying between the bit's central axis 811 and its nose 817 are located on the secondary profile s while the tips of the cutters on blades 821, 822, and 823 lying between the bit's central axis 811 and its nose 817 are located on the primary profile p.

In general, this difference in profiles means that cutters toward the center of face 812 in passive zone 840 will contact the bottom of the borehole to a reduced extent and the cutting will be performed predominantly by cutters on the primary profile, on blades 821, 823. For this reason, the forces on cutters on the primary profile lying in the active zone are greater than the forces on cutters on the secondary profile lying in the passive zone. Likewise, the torque generated by the cutters on the primary profile that lie in the active zone is greater than the torque generated by the cutters on the secondary profile that lie in the passive zone. The two conditions described above, coupled with the fact that the torque on the portion of the bit face that lies within the radius of nose 817 is greater than the torque generated in the shoulder and gage portions of cutting surface 812, tend to cause the bit to walk in a desired manner. The degree to which walking occurs depends on the degree of difference between the primary and secondary profiles. As the secondary profile becomes more steep, the walk tendency increase. In many instances, it will be desirable to provide a secondary profile that is not overly steep, so as to provide a bit that walks slowly and in a controlled manner.

In an alternative embodiment shown in FIG. 10A, the secondary cutter tip profile s can be parallel to but offset from the primary cutter tip profile p. The net effect on the torque distribution and resultant walking tendencies is comparable to that of the previous embodiment.

Blade Relationship

Referring again to FIG. 9, another factor that influences the bit's tendency to walk is the relationship of the blades and the manner in which they are arranged on the bit face. Specifically, the angles between adjacent pairs of blades and the angles between blades having cutters in redundant positions affects the relative aggressiveness of the active and passive zones and hence the torque distribution on the bit. To facilitate the following discussion, the blade position is used herein to mean the position of a radius drawn through the last or outermost non-gage cutter on a blade. According to the embodiment shown in the Figures, significant angles include those between blades 821 and 823 and between blades 824 and 825. These may be approximately 180 degrees and 60 degrees, respectively. According to an embodiment, the blades in the passive zone, having redundant cutters, are no more than 60 degrees apart.

Imbalance Vectors

In addition to the foregoing factors, a bit in accordance with embodiments of the present invention may have an imbalance vector that has a magnitude of approximately 10 to 25 percent of its weight on bit and more at least 15 percent of its weight on bit, depending on its size. The imbalance force vector may lie in the active zone 820 and preferably in the leading half of the active zone 820. In some embodiments, the imbalance force vector is oriented as closely as possible to the leading edge of active zone 820 (blade 821). The tendency of a bit to walk increases as the magnitude of the imbalance force vector increases. Similarly, the tendency of a bit to walk increases as the imbalance force vector approaches leading blade 821. The magnitude of the imbalance force can be increased by manipulating the geometric parameters that define the positions of the PDC cutters on the bit, such as back rake, side rake, height, angular position and profile angle. Likewise, the desired direction of the imbalance force vector can be achieved by manipulation of the same parameters.

In other embodiments, the present invention may be used to model the performance of rotary steerable systems that include both a bit and a hole opener. Vibrational analysis may be particularly important in these systems, given the demands and constraints that such systems are under.

While reference has been made to a fixed blade hole opener, those having ordinary skill in the art will recognize that expandable hole openers may also be used. Expandable hole openers are disclosed, for example, in U.S. Pat. No. 6,732,817, which is assigned to the assignee or the present invention and is incorporated by reference. In addition, those having ordinary skill will recognize that concentric or eccentric hole openers may be used.

Figure 11:
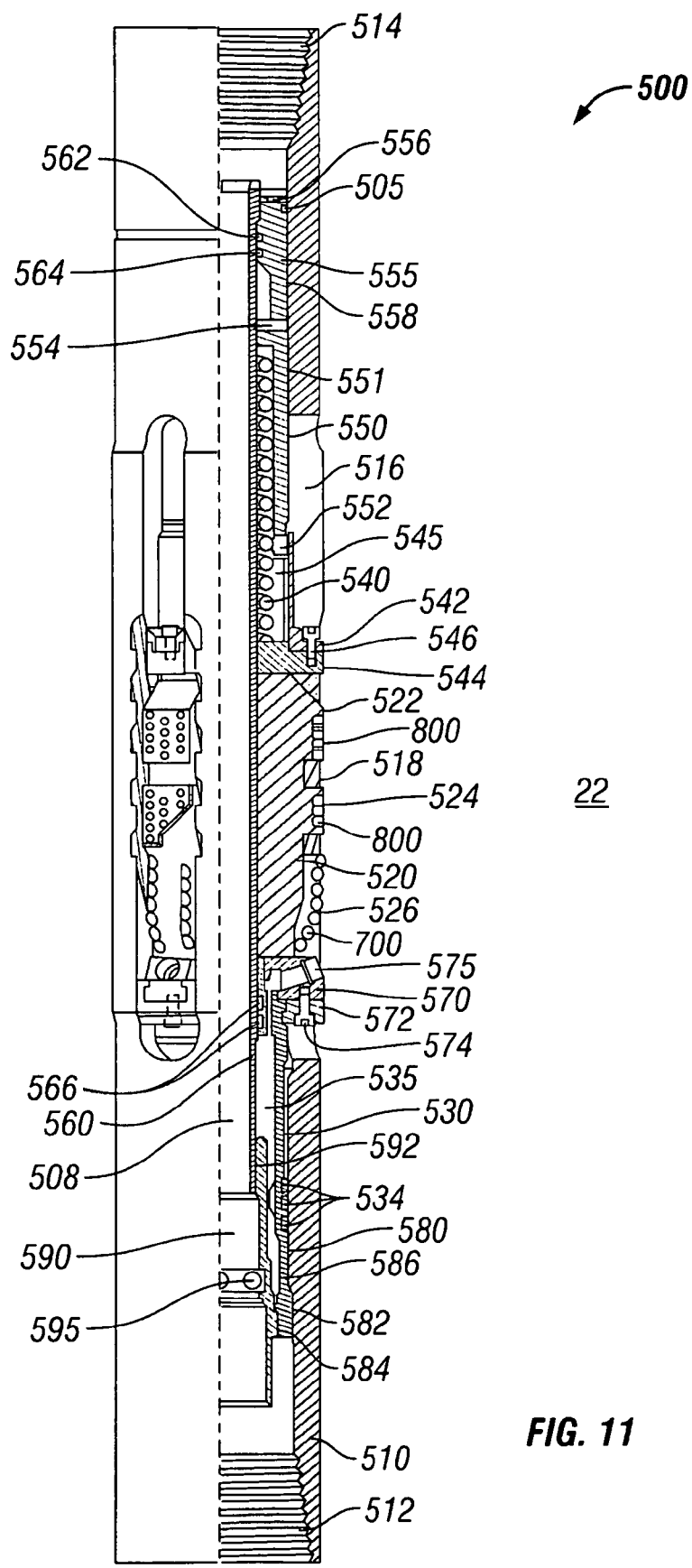
FIG. 11 is a cross sectional elevation view of one embodiment of the expandable tool of the present invention, showing the moveable arms in the collapsed position.
Figure 12:
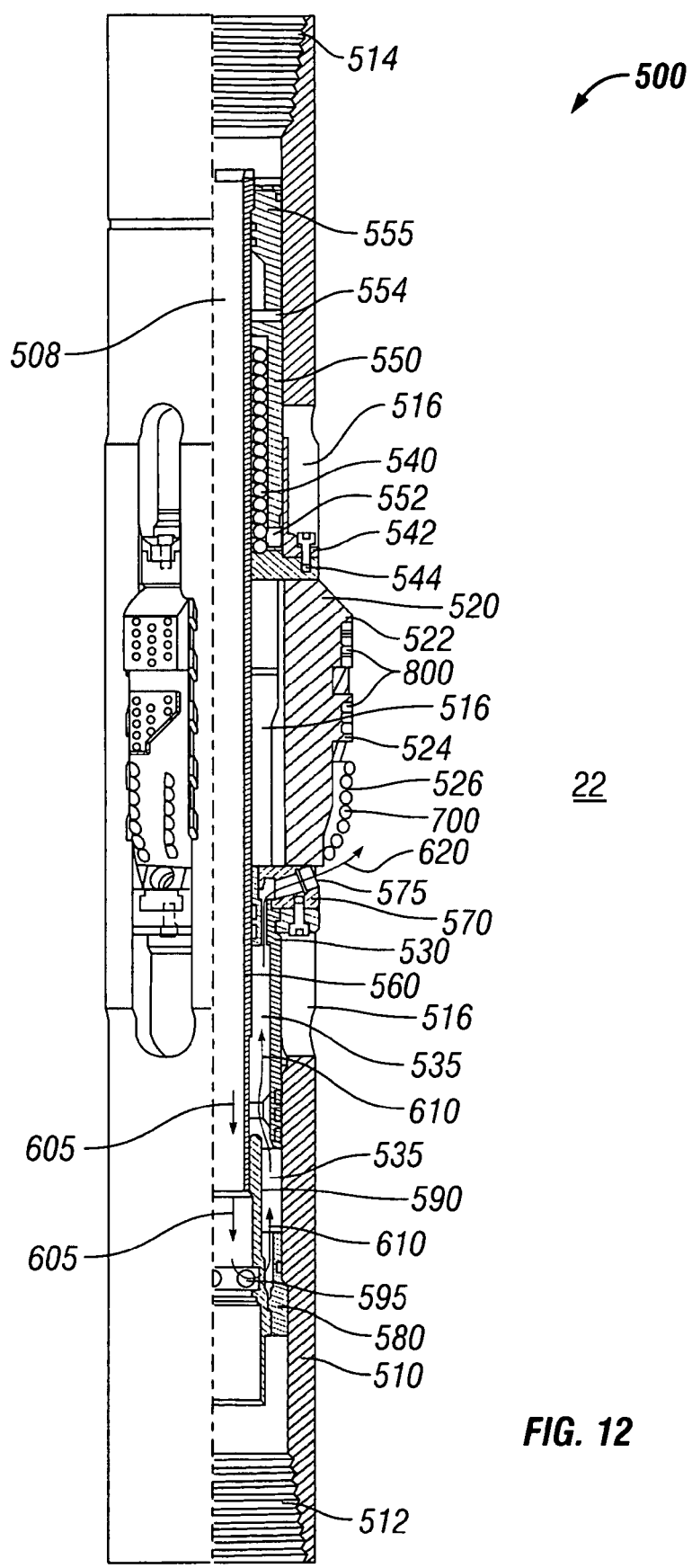
FIG. 12 is a cross-sectional elevation view of the expandable tool of FIG. 11, showing the moveable arms in the expanded position.

Referring now to FIGS. 11 and 12, an expandable tool which may be used in embodiments of the present invention, generally designated as 500, is shown in a collapsed position in FIG. 11 and in an expanded position in FIG. 12. The expandable tool 500 comprises a generally cylindrical tool body 510 with a flowbore 508 extending therethrough. The tool body 510 includes upper 514 and lower 512 connection portions for connecting the tool 500 into a drilling assembly. In approximately the axial center of the tool body 510, one or more pocket recesses 516 are formed in the body 510 and spaced apart azimuthally around the circumference of the body 510. The one or more recesses 516 accommodate the axial movement of several components of the tool 500 that move up or down within the pocket recesses 516, including one or more moveable, non-pivotable tool arms 520. Each recess 516 stores one moveable arm 520 in the collapsed position.

FIG. 12 depicts the tool 500 with the moveable arms 520 in the maximum expanded position, extending radially outwardly from the body 510. Once the tool 500 is in the borehole, it is only expandable to one position. Therefore, the tool 500 has two operational positions—namely a collapsed position as shown in FIG. 11 or an expanded position as shown in FIG. 12. However, the spring retainer 550, which is a threaded sleeve, can be adjusted at the surface to limit the full diameter expansion of arms 520. The spring retainer 550 compresses the biasing spring 540 when the tool 500 is collapsed, and the position of the spring retainer 550 determines the amount of expansion of the arms 520. The spring retainer 550 is adjusted by a wrench in the wrench slot 554 that rotates the spring retainer 550 axially downwardly or upwardly with respect to the body 510 at threads 551. The upper cap 555 is also a threaded component that locks the spring retainer 550 once it has been positioned. Accordingly, one advantage of the present tool is the ability to adjust at the surface the expanded diameter of the tool 500. Unlike conventional underreamer tools, this adjustment can be made without replacing any components of the tool 500.

In the expanded position shown in FIG. 12, the arms 520 will either underream the borehole or stabilize the drilling assembly, depending upon how the pads 522, 524 and 526 are configured. In the configuration of FIG. 12, cutting structures 700 on pads 526 would underream the borehole. Wear buttons 800 on pads 522 and 524 would provide gauge protection as the underreaming progresses. Hydraulic force causes the arms 520 to expand outwardly to the position shown in FIG. 12 due to the differential pressure of the drilling fluid between the flowbore 508 and the annulus 22.

The drilling fluid flows along path 605, through ports 595 in the lower retainer 590, along path 610 into the piston chamber 535. The differential pressure between the fluid in the flowbore 508 and the fluid in the borehole annulus 22 surrounding tool 500 causes the piston 530 to move axially upwardly from the position shown in FIG. 11 to the position shown in FIG. 12. A small amount of flow can move through the piston chamber 535 and through nozzles 575 to the annulus 22 as the tool 500 starts to expand. As the piston 530 moves axially upwardly in pocket recesses 516, the piston 530 engages the drive ring 570, thereby causing the drive ring 570 to move axially upwardly against the moveable arms 520. The arms 520 will move axially upwardly in pocket recesses 516 and also radially outwardly as the arms 520 travel in channels 518 disposed in the body 510. In the expanded position, the flow continues along paths 605, 610 and out into the annulus 22 through nozzles 575. Because the nozzles 575 are part of the drive ring 570, they move axially with the arms 520. Accordingly, these nozzles 575 are optimally positioned to continuously provide cleaning and cooling to the cutting structures 700 disposed on surface 526 as fluid exits to the annulus 22 along flow path 620.

The underreamer tool 500 may be designed to remain concentrically disposed within the borehole. In particular, the tool 500 of the present invention preferably includes three extendable arms 520 spaced apart circumferentially at the same axial location on the tool 510. In the preferred embodiment, the circumferential spacing would be 120 degrees apart. This three arm design provides a full gauge underreaming tool 500 that remains centralized in the borehole at all times.

In some embodiments, the simulation provides visual outputs. In one embodiment, the visual outputs may include performance parameters. Performance parameters, as used herein may include rate of penetration (ROP), forces encountered, force imbalance, degree of imbalance, maximum, minimum, and/or average forces (including but not limited to vibrational, torsional, lateral, and axial). The outputs may include tabular data of one or more performance parameters. Additionally, the outputs may be in the form of graphs of a performance parameter, possibly with respect to time. A graphical visualization of the drill bit, drill string, and/or the drilling tools (e.g., a hole opener) may also be output. The graphical visualization (e.g., 2-D, 3-D, or 4-D) may include a color scheme for the drill string and BHA to indicate performance parameters at locations along the length of the drill string and bottom hole assembly.

Visual outputs that may be used in the present invention include any output shown or described in any of U.S. patent application No. 09/524,088 (now U.S. Pat. No. 6,516,293), Ser. No. 09/635,116 (now U.S. Pat. No. 6,873,947), Ser. Nos. 10/749,019, 09/689,299 (now U.S. Pat. No. 6,785,641), Ser. No. 10/852,574 (now U.S. Pat. No. 7,139,689), Ser. No. 10/851,677 (now U.S. Pat. No. 7,020,597), Ser. Nos. 10/888,358, 10/888,446, all of which are expressly incorporated by reference in their entirety.

The overall drilling performance of the drill string and bottom hole assembly may be determined by examining one or more of the available outputs. One or more of the outputs may be compared to the selected drilling performance criterion to determine suitability of a potential solution. For example, a 3-D graphical visualization of the drill string may have a color scheme indicating vibration quantified by the sudden changes in bending moments through the drilling tool assembly. Time based plots of accelerations, component forces, and displacements may also be used to study the occurrence of vibrations. Other drilling performance parameters may also be illustrated simultaneously or separately in the 3-D graphical visualization. Additionally, the 3-D graphical visualization may display the simulated drilling performed by the drilling tool assembly.

Embodiments of the present invention, therefore, provide a coupled analysis of the forces (which include, but are not limited to, torsional, vibrational, axial, and lateral) that are dynamically operating on a drill bit and at least one other drilling tool. In particular embodiments, the at least one other drilling tool may be a hole opener. By providing such an analysis one may be able to determine the forces acting on the bit and drilling tool, in order to minimize vibrations for example. In other embodiments, lateral forces may be minimized. In other embodiments, the ROP of the hole opener and the drill bit may be selected to be substantially the same. In typical prior art applications, the hole opener may have a certain rate of penetration, which may be significantly different from the expected rate of penetration of the drill bit. By using the methodology of the present invention, however, the relative rates of penetration can be predicted, and then different bits and/or hole openers may be selected in order to improve performance.

Method of Dynamically Balancing

Figure 13:
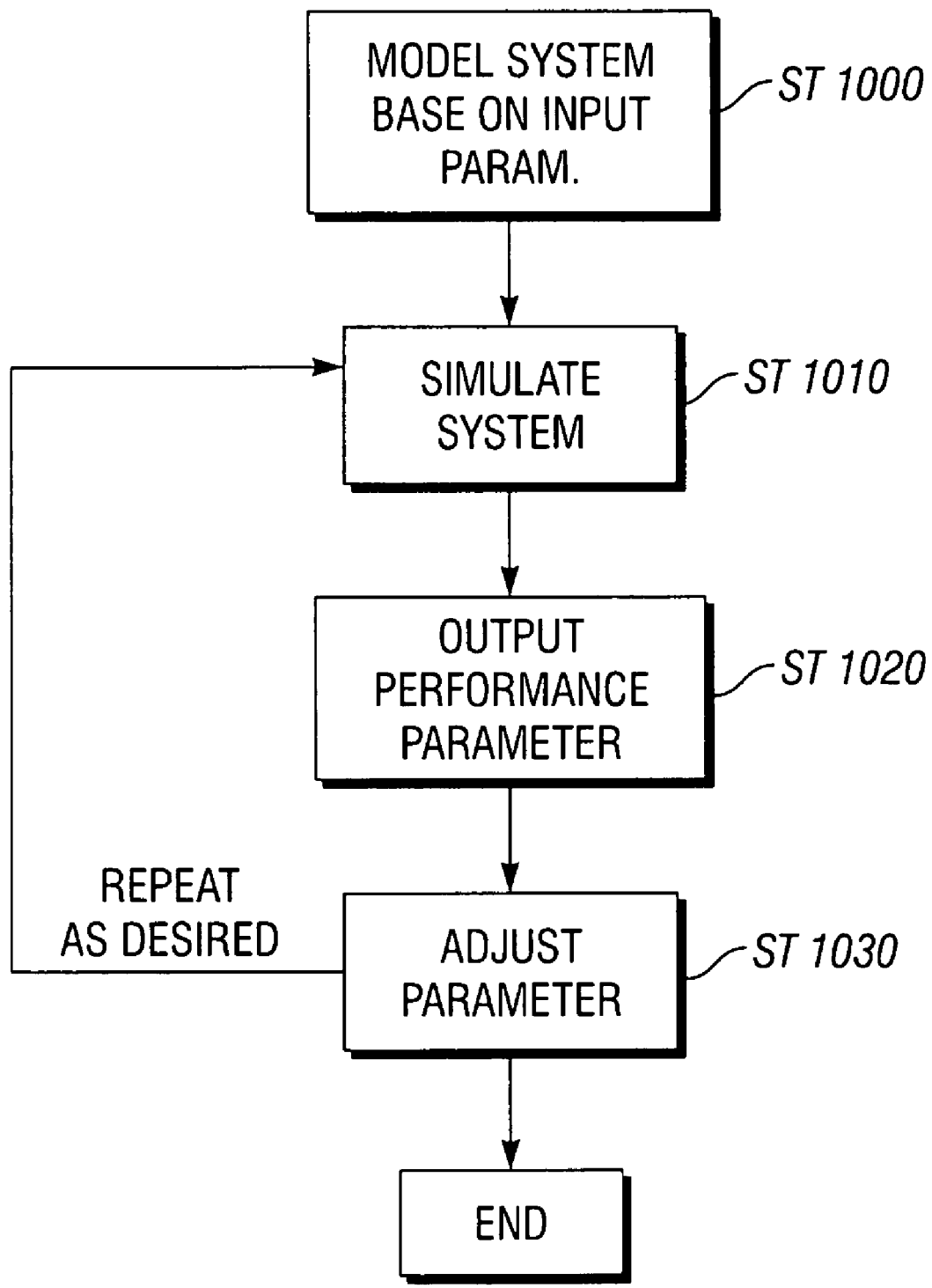
FIG. 13 shows a flow chart of one embodiment of a method of dynamically balancing a hole enlargement system.

A method of dynamically balancing a hole enlargement system (bit and hole-opener combination) is shown in FIG. 13. In ST 1000, a model for the hole enlargement system and the well bore is created using input parameters. The input parameters may include drilling tool assembly design parameters, well bore parameters, and/or drilling operating parameters. Those having ordinary skill in the art will appreciate that other parameters may be used as well.

Examples of drilling tool assembly design parameters include the type, location, and number of components included in the drilling tool assembly; the length, ID, OD, weight, and material properties of each component; the type, size, weight, configuration, and material properties of the drill bit; and the type, size, number, location, orientation, and material properties of the cutting elements on the drill bit. Material properties in designing a drilling tool assembly may include, for example, the strength, elasticity, and density of the material. It should be understood that drilling tool assembly design parameters may include any other configuration or material parameter of the drilling tool assembly without departing from the scope of the invention.

Well bore parameters typically include the geometry of a well bore and formation material properties. The trajectory of a well bore in which the drilling tool assembly is to be confined also is defined along with an initial well bore bottom surface geometry. Because the well bore trajectory may be straight, curved, or a combination of straight and curved sections, well bore trajectories, in general, may be defined by defining parameters for each segment of the trajectory. For example, a well bore may be defined as comprising N segments characterized by the length, diameter, inclination angle, and azimuth direction of each segment and an indication of the order of the segments (i.e., first, second, etc.). Well bore parameters defined in this manner can then be used to mathematically produce a model of the entire well bore trajectory. Formation material properties at various depths along the well bore may also be defined and used. One of ordinary skill in the art will appreciate that well bore parameters may include additional properties, such as friction of the walls of the well bore and well bore fluid properties, without departing from the scope of the invention.

Drilling operating parameters typically include the rotary table (or top drive mechanism), speed at which the drilling tool assembly is rotated (RPM), the downhole motor speed (if a downhole motor is included) and the hook load. Drilling operating parameters may further include drilling fluid parameters, such as the viscosity and density of the drilling fluid, for example. It should be understood that drilling operating parameters are not limited to these variables. In other embodiments, drilling operating parameters may include other variables, e.g. rotary torque and drilling fluid flow rate. Additionally, drilling operating parameters for the purpose of drilling simulation may further include the total number of drill bit revolutions to be simulated or the total drilling time desired for drilling simulation. Once the parameters of the system (drilling tool assembly under drilling conditions) are defined, they can be used along with various interaction models to simulate the dynamic response of the drilling tool assembly drilling earth formation as described below.

After the hole enlargement system has been modeled, the system is simulated using the techniques described above (ST 1010). The simulation may be run, for example, for a selected number of drill bit rotations, depth drilled, duration of time, or any other suitable criteria. After completion of the simulation, performance parameter(s) are output (ST 1020).

Examples of performance parameters include rate of penetration (ROP), rotary torque required to turn the drilling tool assembly, rotary speed at which the drilling tool assembly is turned, drilling tool assembly lateral, axial, or torsional vibrations induced during drilling, weight on bit (WOB), forces acting on components of the drilling tool assembly, and forces acting on the drill bit and components of the drill bit (e.g., on blades, cones, and/or cutting elements). Drilling performance parameters may also include the inclination angle and azimuth direction of the borehole being drilled. One skilled in the art will appreciate that other drilling performance parameters exist and may be considered without departing from the scope of the invention.

After the performance parameter has been output, a designer may adjust an input parameter (ST 1030). For example, the axial location of the hole opener may be changed, the number of blades/cutting elements modified, the type of bit, the type of hole opener, etc. Those having ordinary skill in the art will appreciate that one or more of the input parameters described above may be altered in conjunction as well. After at least one parameter has been adjusted, the simulation may be repeated, and the effect on performance parameter(s) reviewed.

This process may be repeated until the :system is dynamically "balanced." As used herein, the term "balanced" does not necessarily require that forces acting on the various components be equal, but rather that the overall behavior of the system is acceptable to a designer. This state may be referred to as a "balance condition." For example a designer may be seeking to reduce the overall vibration and/or lateral movement occurring in the system.

Similarly, in another embodiment of the present invention, methods in accordance with the present invention are used to dynamically balance a drill string or BHA including multiple formation engaging or cutting tools (e.g., bit and hole-opener or reamer, etc.). The individual cutting tools may be modeled using any techniques described above, and the models may be then coupled together using mathematical techniques (finite element analysis, finite boundary analysis, vibrational analysis, etc) to form a drill string model for simulation, analysis and design. Alternatively, parameters for models of individual cutting tools may be separately defined and then coupled together to forma a system model using mathematical techniques (finite element analysis, finite boundary analysis, vibrational analysis, etc).

In other embodiments, the performance may be modeled to determine desirable (i.e., good performing) combinations of bits and other drilling tools. In other embodiments, the location of the at least one other drilling tool may be changed in order to determine the effect. In particular, in certain embodiments, a hole opener may be moved up and down the drill string to determine a suitable location, by monitoring the effect on vibrations.

Also, while embodiments of the present invention have specifically referenced certain cutting tools, it should be recognized that the invention more generally applies to the concept of coupling vibrational analysis of two or more cutting tools. In certain embodiments, the second cutting tool may not be used to enlarge the borehole, but may simply be maintaining borehole diameter.

In other embodiments of the invention, methods in accordance with the above disclosure may be used to model and or graphically display various aspects of the drill string, such as dynamic response, and drilling performance. In particular, in one embodiment, the time dependent change in hole size (hole size vs. time effect) may be modeled and/or graphically displayed. For example, in one embodiment, the hole size in a selected interval may increase due to hole slough off or swelling effects. This aspect may be modeled based on MWD or LWD data taken from similar formations that have been drilled in the past.

In addition, the wellbore may be meshed (using mathematical techniques) to determine the interaction between cutters and the wellbore. During selected iterations, the wellbore may be updated and forces on the tool determined during the iterations. In that fashion a "real-time" simulation, updating both the forces acting on the cutters and its effects on the wellbore may be displayed to a designer.

Furthermore, as explained above, the drill string may include a first cutting structure axially displaced from a second cutting structure. It is expressly within the scope of the present invention that other components may be present inbetween (or above or below) one or both of the first and second cutting structures. These other components (which may include, for example, a motor or other rotary driving tool) may be taken into account (or may be ignored). In the event that one or more of these other components is accounted for, the stiffness and mass of the other components may be considered in determining the dynamic response of the drill string in the case where the other components may include a motor, for example, the torque or speed produced by the component may be taken into account.

Alternatively, in selected embodiments, a simplified model may be used wherein the drill string is modeled as a spring having a mass, stiffness, and damping characteristics.

Information produced during simulations in accordance with embodiments of the present invention may be used to assist a designer in a number of ways. For example, information produced may assist a designer in designing a drill string (i.e., modifying at least one design parameter such as axial locations of the cutting tools, cutter placements on cutting tool, blade geometry, etc.). For a given cutting tool, information generated may be used to assist in optimizing a second cutting tool. For example, for a selected reamer, the information generated may be used to optimize (improve) bit performance (i.e., reduce vibration, torque balance, force balance, etc.).

Alternatively, for a selected bit, the information generated may be used to optimize (improve) reamer performance (i.e., reduce vibration, torque balance, force balance, etc.). In other embodiments, the information may be used to balance the depth of cut of the cutting tools, and/or it may be used to match the rate of penetration between cutting tools, and/or to balance weight on bit between cutting tools. Those having ordinary skill in the art will appreciate that the information generated may be used to do one or more of the above items simultaneously, or may be used to adjust other performance related parameters as well.

In other embodiments, the information may be used to adjust the relative location of cutting tools in order to reduce vibration (and/or force imbalance, and/or torque imbalance, for example). As one example, in direction drilling, to reduce vibrations caused by a hole opener, the blade geometry of the hole opener may be adjusted to provide more continuous contact between blades and the formation as blades turn from bottom side of hole (full contact) to the top side of the hole (often no contact because tool is pulled toward bottom side of hole). In yet other embodiments, the information produced may be used to determine improved drilling parameters (modifying at least one drilling parameter). In one example the overall vibration of the system may be reduced by changing the rotation speed.

Figure 14:
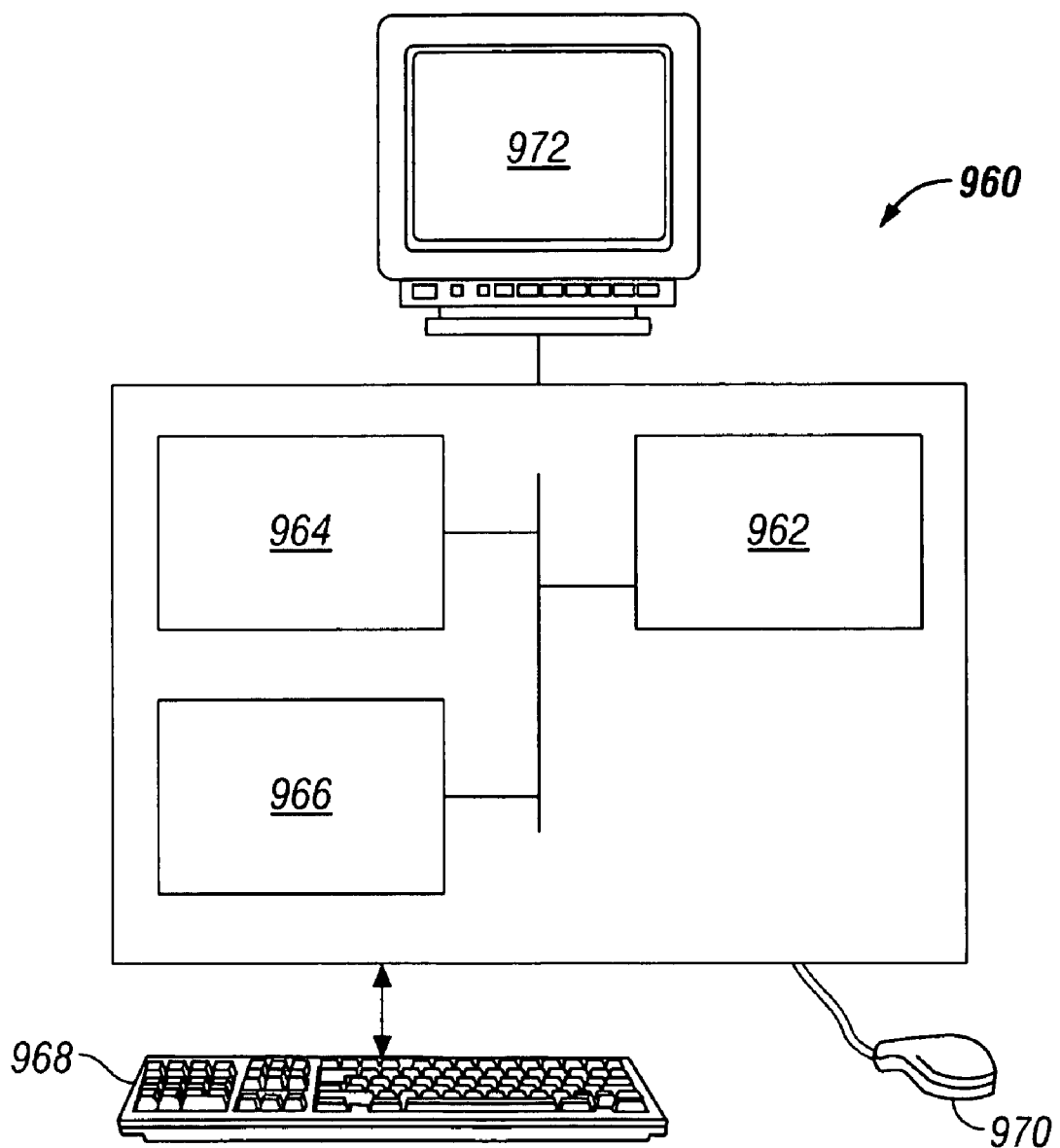
FIG. 14 shows a networked computer system in accordance with an embodiment of the invention.

Aspects of embodiments of the invention, may be implemented on any type of computer regardless of the platform being used. For example, as shown in FIG. 14, a networked computer system (960) that may be used in an embodiment of the invention includes a processor (962), associated memory (964), a storage device (966), and numerous other elements and functionalities typical of today's computers (not shown). The networked computer (960) may also include input means, such as a keyboard (968) and a mouse (970), and output means, such as a monitor (972). The networked computer system (960) is connected to a local area network (LAN) or a wide area network (e.g., the Internet) (not shown) via a network interface connection (not shown). Those skilled in the art will appreciate that these input and output means may take other forms. Additionally, the computer system may not be connected to a network. Further, those skilled in the art will appreciate that one or more elements of the aforementioned computer (960) may be located at a remote location and connected to the other elements over a network.

Embodiments of the invention may provide one or more of the following advantages. Embodiments of the invention may be used to evaluate drilling information to improve drilling performance in a given drilling operation. Embodiments of the invention may be used to identify potential causes of drilling performance problems based on drilling information. In some cases, causes of drilling performance problems may be confirmed performing drilling simulations. Additionally, in one or more embodiments, potential solutions to improve drilling performance may be defined, validated through drilling simulations, and selected based on one or more selected drilling performance criteria. Further, methods in accordance with one or more embodiments of the present invention may provide predictions for the drilling performance of a selected drilling tool assembly. In particular, embodiments of the present invention have particular applicability to monitoring and analyzing dynamic vibrations.

Advantageously, one or more embodiments of the present invention provide a method for obtaining a substantially balanced hole opening system. In this embodiment, a hole opening system includes a two cutting tools (wherein one may be a drill bit, for example). The term substantially balanced means, in this embodiment, that the forces acting on the cutting tools are approximately comparable, not that they are necessarily the same. In fact, they may be significantly different in magnitude, but may be balanced in direction only.

Advantageously, one or more embodiments of the present invention may improve the fatigue life of tubulars in the BHA and drill string by minimizing or reducing vibrations and minimizing surface wear on tubulars and cased hole wellbore intervals attributed to excessive lateral movement and vibration. One ore more embodiments of the present invention may enhance performance of other BHA components such as MWD, LWD, rotary steerable tools (push and point), other drive tools (PDM and turbine). These benefits may be achieved through analysis and determination of tool design and placement in assembly so as to reduced vibrations (modes and levels) as per drilling specifics of programs; formation characteristics and/or directional considerations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of dynamically balancing a hole enlargement system, comprising:
   modeling the hole enlargement system based on input parameters, wherein the hole enlargement system comprises a drill bit and a hole opener;
   simulating the hole enlargement system;
   adjusting one or more of the input parameters;
   repeating the modeling, simulating, and adjusting until a balanced condition is met; and
   graphically displaying at least one aspect of the simulating.

2. The method of claim 1, wherein the balanced condition comprises substantially balanced forces acting on the hole enlargement system.

3. The method of claim 2, wherein the substantially balanced forces comprise at least one force selected from the group of axial force, lateral force, torsional force, and vibrational force.

4. The method of claim 1, wherein the balanced condition comprises substantially balanced torque acting on the hole enlargement system.

5. The method of claim 1, wherein the balanced condition comprises the drill bit and the hole opener having substantially the same rate of penetration.

6. A bottom hole assembly designed using the method of claim 1.

7. A method of increasing the life of one or more components in a bottom hole assembly, comprising:
   modeling dynamic vibrations occurring in a bottom hole assembly while drilling;
   adjusting one or more aspects of the bottom hole assembly based on outputs produced by modeling, wherein the adjusting comprises moving an axial location of at least one component of the bottom hole assembly to reduce or minimize the dynamic vibrations, and wherein the at least one component comprises a hole opener; and
   graphically displaying at least one output produced by modeling.

* * * * *